US012739189B2

(12) United States Patent
Raman et al.

(10) Patent No.: US 12,739,189 B2
(45) Date of Patent: Sep. 15, 2026

(54) OPTIMIZED ASSIGNMENT OF REPLICATION-MULTICAST IP ADDRESSES TO OVERLAY-MULTICAST GROUPS

(71) Applicant: VMware LLC, Palo Alto, CA (US)

(72) Inventors: Chidambareswaran Raman, Sunnyvale, CA (US); Senthilkumar Karunakaran, Santa Clara, CA (US); Subin Cyriac Mathew, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 347 days.

(21) Appl. No.: 18/220,291

(22) Filed: Jul. 11, 2023

(65) Prior Publication Data

US 2025/0023813 A1 Jan. 16, 2025

(51) Int. Cl.
*H04L 45/16* (2022.01)
*H04L 45/64* (2022.01)

(52) U.S. Cl.
CPC .............. *H04L 45/16* (2013.01); *H04L 45/64* (2013.01)

(58) Field of Classification Search
CPC ................................ H04L 45/16; H04L 45/64
See application file for complete search history.

(56) References Cited

U.S. PATENT DOCUMENTS 5,079,767 A 1/1992 Perlman
5,128,926 A 7/1992 Perlman et al.
(Continued)

FOREIGN PATENT DOCUMENTS

CN 101102214 A 1/2008
CN 101222346 A 7/2008
(Continued)

OTHER PUBLICATIONS

Non-Published Commonly Owned Related U.S. Appl. No. 18/220,292 with similar specification, filed Jul. 11, 2023, 55 pages, VMware, Inc.

(Continued)

*Primary Examiner* — Donald L Mills
(74) *Attorney, Agent, or Firm* — Kim & Stewart LLP

(57) ABSTRACT

Some embodiments provide a novel method for efficiently assigning replication-multicast network addresses to overlay-multicast groups of machines executing on host computers of a software-defined network (SDN). For a source machine that is a source of one or more multicast flows, an SDN controller receives from the source machine an overlay-multicast group network address of an overlay-multicast group for which the source machine is the source, and an overlay-multicast source network address associated with the source machine. The SDN controller uses the overlay-multicast group and source network addresses to determine a replication-multicast network address for the overlay-multicast group. The replication-multicast group network address is determined using both the overlay-multicast group and source network address to avoid different overlay-multicast groups being assigned a same replication-multicast network address. The source machine uses the replication-multicast group network address to forward the multicast flows to destination machines that are members of the overlay-multicast group.

20 Claims, 13 Drawing Sheets

(56) References Cited

U.S. PATENT DOCUMENTS

| | | | |
|---|---|---|---|
| 6,154,463 | A | 11/2000 | Aggarwal et al. |
| 7,317,722 | B2 | 1/2008 | Aquino et al. |
| 7,802,000 | B1 | 9/2010 | Huang et al. |
| 7,925,778 | B1 | 4/2011 | Wijnands et al. |
| 8,111,633 | B1 | 2/2012 | Aggarwal et al. |
| 8,537,816 | B2 | 9/2013 | Anumala et al. |
| 8,665,887 | B2 | 3/2014 | Ge et al. |
| 8,908,686 | B1 | 12/2014 | Ghosh |
| 9,043,452 | B2 | 5/2015 | Fulton |
| 9,137,045 | B2 | 9/2015 | Chen et al. |
| 9,270,585 | B2 | 2/2016 | Manion et al. |
| 9,432,204 | B2 | 8/2016 | Shen et al. |
| 9,479,348 | B2 | 10/2016 | Sreeramoju et al. |
| 9,602,385 | B2 | 3/2017 | Tessmer et al. |
| 9,692,655 | B2 | 6/2017 | Koponen et al. |
| 9,794,079 | B2 | 10/2017 | Tessmer et al. |
| 10,015,643 | B2 | 7/2018 | Zuniga et al. |
| 10,198,492 | B1 | 2/2019 | O'Neill et al. |
| 10,218,523 | B2 | 2/2019 | Boutros et al. |
| 10,263,884 | B2 | 4/2019 | Kota et al. |
| 10,454,833 | B1 | 10/2019 | Bosshart et al. |
| 10,484,303 | B2 | 11/2019 | Shepherd et al. |
| 10,503,565 | B2 | 12/2019 | Guo et al. |
| 10,511,548 | B2 | 12/2019 | Liu et al. |
| 10,523,455 | B2 | 12/2019 | Boutros et al. |
| 10,560,375 | B2 | 2/2020 | Lim |
| 10,567,187 | B2 | 2/2020 | Mathew et al. |
| 10,873,473 | B2 | 12/2020 | Boutros et al. |
| 10,904,134 | B2 | 1/2021 | Jiang et al. |
| 10,958,462 | B2 | 3/2021 | Boutros et al. |
| 10,979,246 | B2 | 4/2021 | Boutros et al. |
| 11,063,872 | B2 | 7/2021 | Mathew et al. |
| 11,595,296 | B2 | 2/2023 | Selvaraj et al. |
| 2003/0088696 | A1 | 5/2003 | McCanne |
| 2003/0152098 | A1 | 8/2003 | Zhu |
| 2003/0165140 | A1 | 9/2003 | Tang et al. |
| 2004/0258003 | A1 | 12/2004 | Kokot et al. |
| 2005/0175009 | A1 | 8/2005 | Bauer |
| 2006/0153219 | A1 | 7/2006 | Wong et al. |
| 2007/0104192 | A1 | 5/2007 | Yoon et al. |
| 2009/0147786 | A1 | 6/2009 | Li et al. |
| 2009/0279701 | A1 | 11/2009 | Moisand et al. |
| 2011/0158113 | A1 | 6/2011 | Nanda et al. |
| 2011/0211517 | A1 | 9/2011 | Moscibroda et al. |
| 2012/0033668 | A1 | 2/2012 | Humphries |
| 2013/0044641 | A1 | 2/2013 | Koponen et al. |
| 2013/0051399 | A1 | 2/2013 | Zhang et al. |
| 2013/0058229 | A1 | 3/2013 | Casado et al. |
| 2013/0103817 | A1 | 4/2013 | Koponen et al. |
| 2013/0107699 | A1 | 5/2013 | Miclea |
| 2013/0107883 | A1 | 5/2013 | Ashwood-Smith |
| 2013/0114466 | A1 | 5/2013 | Koponen et al. |
| 2013/0117428 | A1 | 5/2013 | Koponen et al. |
| 2013/0117429 | A1 | 5/2013 | Koponen et al. |
| 2013/0128886 | A1 | 5/2013 | Shah |
| 2013/0188521 | A1 | 7/2013 | Jain |
| 2013/0287026 | A1 | 10/2013 | Davie |
| 2013/0294448 | A1 | 11/2013 | Mentze et al. |
| 2013/0322443 | A1 | 12/2013 | Dunbar et al. |
| 2013/0329605 | A1 | 12/2013 | Nakil et al. |
| 2014/0003427 | A1 | 1/2014 | Nishi et al. |
| 2014/0064142 | A1 | 3/2014 | Mylarappa et al. |
| 2014/0098813 | A1 | 4/2014 | Mishra et al. |
| 2014/0098815 | A1 | 4/2014 | Mishra et al. |
| 2014/0146817 | A1 | 5/2014 | Zhang |
| 2014/0185613 | A1 | 7/2014 | Sato |
| 2014/0198661 | A1 | 7/2014 | Raman et al. |
| 2014/0223435 | A1 | 8/2014 | Chang |
| 2014/0328159 | A1 | 11/2014 | Rebella et al. |
| 2015/0009995 | A1 | 1/2015 | Gross, IV et al. |
| 2015/0016286 | A1 | 1/2015 | Ganichev et al. |
| 2015/0016460 | A1 | 1/2015 | Zhang et al. |
| 2015/0016469 | A1 | 1/2015 | Ganichev et al. |
| 2015/0055651 | A1 | 2/2015 | Shen et al. |
| 2015/0055652 | A1 | 2/2015 | Yong et al. |
| 2015/0058968 | A1 | 2/2015 | Wang et al. |
| 2015/0063364 | A1 | 3/2015 | Thakkar et al. |
| 2015/0103843 | A1 | 4/2015 | Chandrashekhar et al. |
| 2015/0139238 | A1 | 5/2015 | Pourzandi et al. |
| 2015/0263899 | A1 | 9/2015 | Tubaltsev et al. |
| 2015/0281125 | A1 | 10/2015 | Koponen et al. |
| 2016/0092257 | A1 | 3/2016 | Wang et al. |
| 2016/0092259 | A1 | 3/2016 | Mehta et al. |
| 2016/0094353 | A1 | 3/2016 | Sreeramoju et al. |
| 2016/0094365 | A1 | 3/2016 | Subramaniyam et al. |
| 2016/0094366 | A1 | 3/2016 | Wang et al. |
| 2016/0094396 | A1 | 3/2016 | Chandrashekhar et al. |
| 2016/0094398 | A1 | 3/2016 | Choudhury et al. |
| 2016/0105333 | A1 | 4/2016 | Lenglet et al. |
| 2016/0226671 | A1 | 8/2016 | Lemoine |
| 2016/0241410 | A1 | 8/2016 | Lemoine |
| 2017/0099156 | A1 | 4/2017 | Qiu et al. |
| 2018/0063193 | A1 | 3/2018 | Chandrashekhar et al. |
| 2018/0234259 | A1 | 8/2018 | Du et al. |
| 2019/0007342 | A1 | 1/2019 | Wang et al. |
| 2019/0020490 | A1 | 1/2019 | Boutros et al. |
| 2019/0020491 | A1 | 1/2019 | Boutros et al. |
| 2019/0020492 | A1 | 1/2019 | Boutros et al. |
| 2019/0028328 | A1 | 1/2019 | Tessmer et al. |
| 2019/0123962 | A1* | 4/2019 | Guo ........................ H04L 41/12 |
| 2019/0158381 | A1 | 5/2019 | Beeram et al. |
| 2019/0182061 | A1 | 6/2019 | Boutros et al. |
| 2020/0036646 | A1 | 1/2020 | Mathew et al. |
| 2020/0067818 | A1 | 2/2020 | Jeuk et al. |
| 2020/0067819 | A1 | 2/2020 | Basavaraj et al. |
| 2021/0099400 | A1 | 4/2021 | Elizabeth et al. |
| 2021/0111914 | A1 | 4/2021 | Boutros et al. |
| 2021/0126866 | A1 | 4/2021 | Mathew et al. |
| 2021/0160169 | A1* | 5/2021 | Shen ....................... H04L 45/02 |
| 2021/0218587 | A1 | 7/2021 | Mishra et al. |
| 2021/0218684 | A1 | 7/2021 | Rekhate et al. |
| 2021/0243044 | A1 | 8/2021 | Chokkanathapuram Sundaram et al. |
| 2021/0243253 | A1 | 8/2021 | Pang et al. |
| 2021/0314263 | A1 | 10/2021 | Mathew et al. |
| 2022/0045875 | A1 | 2/2022 | Zhou et al. |
| 2022/0166718 | A1* | 5/2022 | Kamisetty ........... G06F 9/30036 |
| 2022/0231875 | A1 | 7/2022 | Karunakaran et al. |
| 2022/0376936 | A1* | 11/2022 | Dunbar ................. H04L 12/185 |
| 2022/0417132 | A1 | 12/2022 | Selvaraj et al. |
| 2022/0417133 | A1 | 12/2022 | Selvaraj et al. |
| 2023/0164067 | A1 | 5/2023 | Karunakaran et al. |
| 2024/0146556 | A1 | 5/2024 | Joshi et al. |

FOREIGN PATENT DOCUMENTS

| | | | |
|---|---|---|---|
| CN | 103516542 | A | 1/2014 |
| CN | 104243323 | A | 12/2014 |
| CN | 104426681 | A | 3/2015 |
| CN | 104871483 | A | 8/2015 |
| CN | 105684363 | A | 6/2016 |
| CN | 106165358 | A | 11/2016 |
| CN | 106850878 | A | 6/2017 |
| EP | 1876766 | A1 | 1/2008 |
| GB | 2529705 | A | 3/2016 |
| WO | 2015054671 | A2 | 4/2015 |
| WO | 2015142404 | A1 | 9/2015 |
| WO | 2019018261 | A1 | 1/2019 |
| WO | 2023091336 | A1 | 5/2023 |

OTHER PUBLICATIONS

Non-Published Commonly Owned U.S. Appl. No. 18/244,236, filed Sep. 9, 2023, 48 pages, VMware, Inc.

Non-Final Office Action mailed Apr. 30, 2025 in U.S. Appl. No. 18/220,292, 35 pages.

* cited by examiner

SDN Controller Data Store 400

Overlay-Multicast Group Addresses 410

| Multicast Group Key (Source, Group) 420 | Receiver VTEP List 430 | Assigned Replication-Multicast IP address 440 | Source VTEP List 450 |
|---|---|---|---|
| (10.1.1.1, 232.1.1.1) | 3, 4, 5, 6 | 240.3.3.3 | 1 |
| (20.1.1.1, 232.1.1.1) | 6 | 240.4.4.4 | 2 |
| (10.1.1.1, 232.2.2.2) | 6 | 241.3.3.3 | 2 |

*Figure 4*

Host Computer Data Store 500

| Overlay-Multicast Group Memberships 510 | |
|---|---|
| Machine 520 | Joined Replication-Multicast Group 530 |
| Machine 1 | None |
| Machine 2 | None |
| Machine 3 | (VTEP-1, 240.3.3.3) |
| Machine 4 | (VTEP-1, 240.3.3.3) |
| Machine 5 | (VTEP-1, 240.3.3.3) |
| Machine 6 | (VTEP-1, 241.4.4.4) (VTEP-2, 240.3.3.3) |

*Figure 5*

L2 Switch Data Store 800

| Overlay-Multicast Groups 810 | |
|---|---|
| Overlay-Multicast Group (Source, Replication-Multicast) 820 | Receiver VTEP Port List 830 |
| (*, 240.2.2.2) | 3, 4, 5, 6 |
| (VTEP-1-IP, 240.2.2.3) | 3, 4, 5 |
| (VTEP-2-IP, 240.2.2.3) | 6 |
| (VTEP-1-IP, 241.4.4.4) | 6 |

*Figure 8*

OPTIMIZED ASSIGNMENT OF REPLICATION-MULTICAST IP ADDRESSES TO OVERLAY-MULTICAST GROUPS

BACKGROUND

In a software-defined network (SDN) environment, multicast traffic replication from an overlay network destined to other transport nodes (e.g., host computers, machines, etc.) is offloaded to Top of Rack (ToR) switches. Transport nodes with overlay-multicast group listeners (e.g., Internet Group Management Protocol (IGMP)) join ToR switches using replication-multicast Internet Protocol (IP) addresses derived using a hash calculation of overlay-multicast group IP addresses from a pool of replication-multicast IP addresses. In some embodiments, the pool of replication-multicast IP addresses is configured by a network administrator.

Source transport nodes in some embodiments encapsulate overlay-multicast group traffic with destination IP addresses as the assigned replication-multicast IP address. In such embodiments, the ToR switch replicates multicast traffic destined to replication-multicast IP address in its Layer-2 (L2) transport network. This is performed in some embodiments using an IGMP protocol learning table. Because the hashing algorithm used to map an overlay-multicast group IP address to a replication-multicast IP address considers, in some embodiments, only the overlay-multicast group IP address, there is a high chance of collision in the hash collision. This collision results in mapping multiple overlay-group IP addresses to single replication-multicast group IP address.

In some embodiments, hash collisions cannot be avoided, even with sophisticated hashing algorithms. Overlapping overlay-multicast group IP addresses causes transport nodes to receive replication-multicast group traffic with overlay groups for which they are not a part. This results in high receive-side uplink bandwidth usage and high central processing unit (CPU) utilization in order to drop these unintended data messages, which causes reduced throughput for overlay-multicast routing. Hence, methods and systems are needed to avoid unintended data messages from reaching a transport node not registered to receive them.

BRIEF SUMMARY

Some embodiments provide a novel method for efficiently assigning replication-multicast network addresses to overlay-multicast groups of machines executing on several host computers of a software-defined network (SDN). For a particular source machine that is a source of one or more multicast data message flows, a set of one or more controllers of the SDN receives from the particular source machine (1) an overlay-multicast group network address of a particular overlay-multicast group for which the particular source machine is the source, and (2) an overlay-multicast source network address associated with the particular source machine. The SDN controller set uses the received overlay-multicast group network address and overlay-multicast source network address to determine a particular replication-multicast network address for the particular overlay-multicast group.

The replication-multicast group network address is determined in some embodiments using the overlay-multicast source network address along with the overlay-multicast group network address in order to avoid different overlay-multicast groups being assigned a same replication-multicast network address. The replication-multicast group network address is used by the particular source machine in some embodiments to forward the one or more multicast data message flows to a set of one or more destination machines that are members of the particular overlay-multicast group.

In some embodiments, the SDN controller set provides a record specifying (1) the overlay-multicast group network address, (2) the overlay-multicast source network address, and (3) the determined replication-multicast group network address to the particular source machine and the set of destination machines. The record is provided to the particular source machine in some embodiments for the particular source machine to encapsulate the one or more multicast data message flows with the replication-multicast network address. The record is provided to the set of destination machines in some embodiments for the set of destination machines to register to receive the one or more multicast data message flows with a Layer-2 (L2) switch.

The L2 switch receives the one or more multicast data message flows from the particular source machine to forward to the set of destination machines. When the L2 switch receives the multicast flows, it identifies the destination as the replication-multicast network address, determines the set of destination machines are the members of the overlay-multicast group associated with the replication-multicast network address, and forwards the flows to the destination machines.

In some embodiments, the record created by the SDN controller set is also stored in a table in a local data store for the SDN controller set. In such embodiments, the table includes a record for each overlay-multicast group of the SDN, inclosing the particular overlay-multicast group. In some embodiments, the SDN controller set also receives, from each destination machine, a destination virtual tunnel endpoint (VTEP) network address of a destination host computer executing the destination machine. In such embodiments, the record further specifies a list including the received destination VTEP network addresses. In some embodiments, the VTEP network addresses are VTEP Internet Protocol (IP) address. In other embodiments, they are VTEP Media Access Control (MAC) addresses. This list is provided in the record to the source and destination machines, and stored in the local data store. The SDN controller set in some embodiments also receives, from each destination machine, the overlay-multicast group network address from the destination machine. This indicates to the SDN controller set that the destination machines are members of the particular overlay-multicast group.

In receiving the overlay-multicast group and source addresses from the particular source machine, the SDN controller set in some embodiments also receives a source VTEP network address of a particular source host computer executing the particular machine. In such embodiments, the SDN controller also specifies the source VTEP network address in the record that is stored in the local data store and provided to the source and destination machines.

In some embodiments, the SDN controller set determines the particular replication-multicast network address by performing a hash calculation using the overlay-multicast group network address and the overlay-multicast source network address. By using the overlay-multicast source network address along with the overlay-multicast group network address, the SDN controller set is less likely to assign the particular overlay-multicast group with a replication-multicast network address that is already assigned to another overlay-multicast group.

The SDN controller set in some embodiments receives the overlay-multicast group network address and the overlay-multicast source network address after the particular source machine begins sending the one or more data message flows. In such embodiments, only when the particular source machine begins sending the multicast flows does it provide the SDN controller set with the overlay-multicast group and source network addresses.

In some embodiments, before the particular replication-multicast network address is a first replication-multicast network address. In such embodiments, before the particular source machine begins sending the one or more data message flows, the SDN controller set (1) receives the overlay-multicast group network address from the particular source machine, and (2) uses the overlay-multicast group network address to determine a second replication-multicast network address for the particular overlay-multicast group.

The first replication-multicast network address is determined in some embodiments to replace the second replication-multicast network address for the particular overlay-multicast group, as the second replication-multicast network address was determined using only the overlay-multicast group address. In some embodiments, the first and second replication-multicast network addresses are a same replication-multicast network address, meaning that the SDN controller set performed two hash calculations that returned the same address. In other embodiments, they are different replication-multicast network addresses, meaning that the SDN controller set using the overlay-multicast source network address in the hash calculation resulted in a different replication-multicast network address for the particular overlay-multicast group.

Some embodiments provide a novel method for optimizing replication of multicast data message flows to overlay-multicast groups of machines executing on several host computers of an SDN. An L2 switch of the SDN receives, from a particular destination machine that is a member of a particular overlay-multicast group, a registration to receive multicast flows from a particular source machine. The registration specifies (1) a particular replication-multicast group network address associated with the particular overlay-multicast group, (2) a particular source identifier (ID) associated with the particular source machine, and (3) a particular destination ID associated with the particular destination machine. The L2 switch stores, in a local data store, a record specifying the particular replication-multicast network address, the particular overlay-multicast source network address, and the particular destination ID. The L2 switch receives, from the particular source machine, a multicast flow specifying the particular replication-multicast network address as its destination and the particular source ID as its source. Based on the stored record, the L2 switch forwards the multicast flow to the particular destination machine.

After receiving the multicast flow, the L2 switch in some embodiments matches the multicast flow to the record using the particular replication-multicast network address and the particular source ID. In such embodiments, the L2 switch forwards the multicast flow to the particular destination machine by identifying the destination ID specified in the record and forwarding the multicast flow to the destination ID. By identifying the record specifying the particular replication-multicast network address and the particular source ID, the L2 switch correctly identifies the destination ID associated with the destination machine that is a member of the particular overlay-multicast group.

In some embodiments, the particular source ID is a particular source VTEP ID identifying a first VTEP port of a first host computer executing the particular source machine, and the particular destination ID is a particular destination VTEP ID identifying a second VTEP port of a second host computer executing the particular destination machine. In some of these embodiments, the particular source VTEP ID is a particular source VTEP IP address of the first VTEP port, and the particular destination VTEP ID is a particular destination VTEP IP address of the second VTEP port. In other embodiments, the particular source VTEP ID is a particular source VTEP MAC address of the first VTEP port, and the particular destination VTEP ID is a particular destination VTEP MAC address of the second VTEP port.

In some embodiments, the particular destination is a first destination machine, the particular overlay-multicast group is a first overlay-multicast group, the registration is a first registration, the particular source machine is a first source machine, the particular source ID is a first source ID, the particular destination ID is a first destination ID, the record in a first record, and the received multicast flow is a first multicast flow. In such embodiments, the L2 switch receives, from a second destination machine that is a member of a second overlay-multicast group, a second registration to receive multicast flows from a second source machine. The second registration specifies (1) the particular replication-multicast network address associated with the second overlay-multicast group, (2) a second source ID associated with the second source machine, and (3) a second destination ID associated with the second destination machine.

The L2 switch stores, in the local data store, a second record specifying the particular replication-multicast network address, the second overlay-multicast source network address, and the second destination ID. The L2 switch receives, from the second source machine, a second multicast flow specifying the particular replication-multicast network address as its destination and the second source ID as its source. Based on the second record, the L2 switch forwards the multicast flow to the second destination machine. Even though both overlay-multicast groups are assigned the same replication-multicast network address, because the L2 switch considers the associated source ID, the second multicast flow is only sent to the second destination machine and not to the first destination machine, and vice versa. In some embodiments, the first source machine executes on a first host computer, and the second source machine executes on a second source host computer.

In some embodiments, the particular overlay-multicast group was assigned the particular replication-multicast network address by a set of one or more controllers of the SDN. In such embodiments, the set of SDN controllers assigned the particular replication-multicast network address to the particular overlay-multicast group using a hash calculation of the particular overlay-multicast group network address and a particular overlay-multicast source network address associated with the particular source machine. By performing a hash calculation using both the overlay-multicast source and group network addresses (rather than just the overlay-multicast group network address), the SDN controller set is less likely to assign a same replication-multicast network address to multiple overlay-multicast groups. However, this still occurs, in some embodiments, which is why the L2 switch uses both the replication-multicast network address and the overlay-multicast source network address for forwarding flows to overlay-multicast groups.

The registration is received at the L2 switch in some embodiments after the particular destination machine received a record from the set of SDN controllers specifying the particular replication-multicast network address and the first source ID for the particular overlay-multicast group. In some embodiments, the registration is an Internet Group Management Protocol (IGMP) request, and is a source specific multicast (SSM) request in some of these embodiments.

In some embodiments, the received multicast flow is encapsulated with the particular replication-multicast network address to specify the destination. This encapsulation includes the particular replication-multicast network address as the destination of the flow. The L2 switch is in some embodiments a Top of Rack (ToR) switch.

The registration received from the first source machine is in some embodiments one of a set of registrations from a set of members of the particular overlay-multicast group. The particular overlay-multicast group can include any number of destination machines as members. In such embodiments, the record further specifies a set of destination VTEP network address associated with the set of members, for the L2 switch to identify and forward the first multicast flow to each of the set of members of the particular overlay-multicast group.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

FIG. 4 illustrates an example SDN controller data store that stores assignments of replication-multicast IP addresses for overlay-multicast groups.

FIG. 5 illustrates an example host computer data store that stores mappings between machines and overlay-multicast groups for which the machines are members.

FIG. 8 illustrates an L2 switch data store that stores records for different overlay-multicast groups in an SDN.

DETAILED DESCRIPTION

Figure 1:
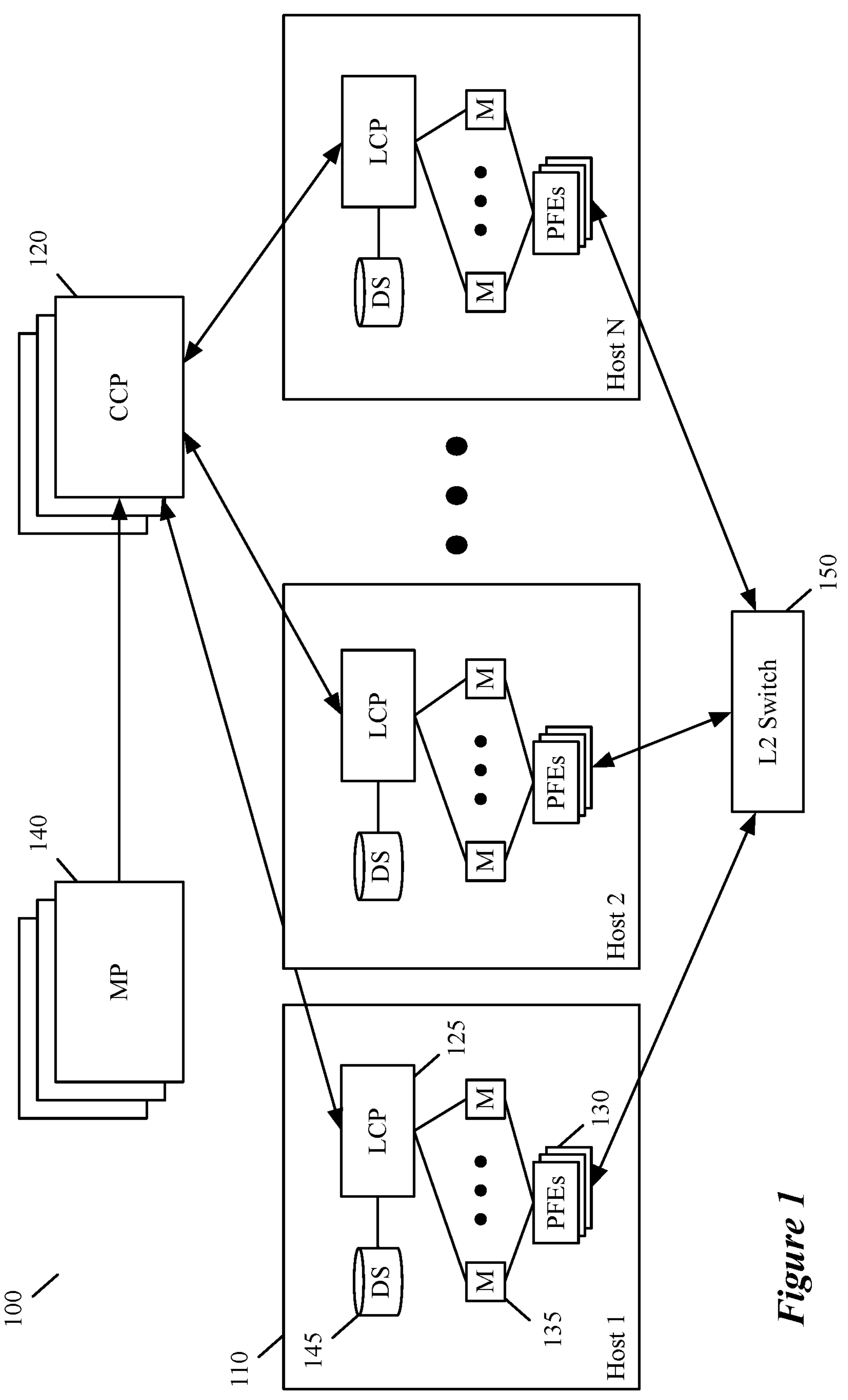
FIG. 1 illustrates an example SDN in which some embodiments of the invention are implemented.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for efficiently assigning replication-multicast network addresses to overlay-multicast groups of machines executing on several host computers of a software-defined network (SDN). For a particular source machine that is a source of one or more multicast data message flows, a set of one or more controllers of the SDN receives from the particular source machine (1) an overlay-multicast group network address of a particular overlay-multicast group for which the particular source machine is the source, and (2) an overlay-multicast source network address associated with the particular source machine. The SDN controller set uses the received overlay-multicast group network address and overlay-multicast source network address to determine a particular replication-multicast network address for the particular overlay-multicast group.

The replication-multicast group network address is determined in some embodiments using the overlay-multicast source network address along with the overlay-multicast group network address in order to avoid different overlay-multicast groups being assigned a same replication-multicast network address. The replication-multicast group network address is used by the particular source machine in some embodiments to forward the one or more multicast data message flows to a set of one or more destination machines that are members of the particular overlay-multicast group.

In some embodiments, the SDN controller set provides a record specifying (1) the overlay-multicast group network address, (2) the overlay-multicast source network address, and (3) the determined replication-multicast group network address to the particular source machine and the set of destination machines. The record is provided to the particular source machine in some embodiments for the particular source machine to encapsulate the one or more multicast data message flows with the replication-multicast network address. The record is provided to the set of destination machines in some embodiments for the set of destination machines to register to receive the one or more multicast data message flows with a Layer-2 (L2) switch.

In some embodiments, the SDN controller set determines the particular replication-multicast network address by performing a hash calculation using the overlay-multicast group network address and the overlay-multicast source network address. By using the overlay-multicast source network address along with the overlay-multicast group network address, the SDN controller set is less likely to assign the particular overlay-multicast group with a replication-multicast network address that is already assigned to another overlay-multicast group.

Some embodiments provide a novel method for optimizing replication of multicast data message flows to overlay-multicast groups of machines executing on several host computers of an SDN. An L2 switch of the SDN receives, from a particular destination machine that is a member of a particular overlay-multicast group, a registration to receive multicast flows from a particular source machine. The registration specifies (1) a particular replication-multicast group network address associated with the particular overlay-multicast group, (2) a particular source identifier (ID) associated with the particular source machine, and (3) a particular destination ID associated with the particular destination machine. The L2 switch stores, in a local data store, a record specifying the particular replication-multicast network address, the particular overlay-multicast source network address, and the particular destination ID. The L2 switch receives, from the particular source machine, a multicast flow specifying the particular replication-multicast network address as its destination and the particular source ID as its source. Based on the stored record, the L2 switch forwards the multicast flow to the particular destination machine.

After receiving the multicast flow, the L2 switch in some embodiments matches the multicast flow to the record using the particular replication-multicast network address and the particular source ID. In such embodiments, the L2 switch forwards the multicast flow to the particular destination machine by identifying the destination ID specified in the record and forwarding the multicast flow to the destination ID. By identifying the record specifying the particular replication-multicast network address and the particular source ID, the L2 switch correctly identifies the destination ID associated with the destination machine that is a member of the particular overlay-multicast group.

In some embodiments, the particular source ID is a particular source VTEP ID identifying a first VTEP port of a first host computer executing the particular source machine, and the particular destination ID is a particular destination VTEP ID identifying a second VTEP port of a second host computer executing the particular destination machine. In some of these embodiments, the particular source VTEP ID is a particular source VTEP IP address of the first VTEP port, and the particular destination VTEP ID is a particular destination VTEP IP address of the second VTEP port. In other embodiments, the particular source VTEP ID is a particular source VTEP MAC address of the first VTEP port, and the particular destination VTEP ID is a particular destination VTEP MAC address of the second VTEP port.

In some embodiments, the particular destination is a first destination machine, the particular overlay-multicast group is a first overlay-multicast group, the registration is a first registration, the particular source machine is a first source machine, the particular source ID is a first source ID, the particular destination ID is a first destination ID, the record in a first record, and the received multicast flow is a first multicast flow. In such embodiments, the L2 switch receives, from a second destination machine that is a member of a second overlay-multicast group, a second registration to receive multicast flows from a second source machine. The second registration specifies (1) the particular replication-multicast network address associated with the second overlay-multicast group, (2) a second source ID associated with the second source machine, and (3) a second destination ID associated with the second destination machine.

The L2 switch stores, in the local data store, a second record specifying the particular replication-multicast network address, the second overlay-multicast source network address, and the second destination ID. The L2 switch receives, from the second source machine, a second multicast flow specifying the particular replication-multicast network address as its destination and the second source ID as its source. Based on the second record, the L2 switch forwards the multicast flow to the second destination machine. Even though both overlay-multicast groups are assigned the same replication-multicast network address, because the L2 switch considers the associated source ID, the second multicast flow is only sent to the second destination machine and not to the first destination machine, and vice versa. In some embodiments, the first source machine executes on a first host computer, and the second source machine executes on a second source host computer.

In an SDN environment, overlay-multicast groups are used in some embodiments to provide data message flows from a single source to multiple destinations. In other embodiments, they are used to provide data message flows from multiple sources to multiple destinations. Destination transport nodes (i.e., destination machines) are members of an overlay-multicast group in order to received multicast flows from the source transport node or nodes (i.e., source machine or machines) of the overlay-multicast group. Overlay-multicast groups are used in some embodiments for streaming media or other data (e.g., audio and video conferencing, multi-party games, content distribution) from one or more sources to multiple destination transport nodes that are to process and/or analyze the streamed data. Overlay-multicast groups are used in other embodiments for finance purposes, such as (1) real-time stock ticker data distribution, signal trading for sophisticated algorithmic trading, and (3) compliance reporting to regulators.

Overlay-multicast group IP addresses are used in some embodiments when an application or machine wishes to subscribe to a multicast stream of data. The subscribing machine in some embodiments identifies the multicast stream using the overlay-multicast group IP address. In some embodiments, the machine uses a protocol, such as Internet Group Management Protocol (IGMP) to subscribe to a multicast data stream.

Replication-multicast IP addresses are used in some embodiments as the destination IP address of the overlay-multicast group to send multicast flows to the members of the overlay-multicast group. In such embodiments, the flows specify the replication-multicast IP address as the destination IP address of the flow, and the machines subscribed to the overlay-multicast group receive the flow. In some embodiments, an overlay-multicast group data message includes an inner IP packet (whose destination IP address is the overlay-multicast group IP address) that is encapsulated with into an encapsulated IP packet (whose destination IP address is the replication-multicast IP address).

In some embodiments, multicast traffic replication from an overlay network destined to other transport nodes is offloaded to Top of Rack (ToR) switches. Transport nodes with overlay-multicast group listeners (e.g., IGMP) join ToR switches using replication-multicast network addresses (e.g., Internet Protocol (IP) addresses) derived using a hash calculation of overlay-multicast group IP addresses from a pool of replication-multicast IP addresses. In some embodiments, the pool of replication-multicast IP addresses is configured by a network administrator.

Source transport nodes in some embodiments encapsulate overlay-multicast group traffic with destination IP addresses as the assigned replication-multicast IP address. In such embodiments, the ToR switch replicates multicast traffic destined to replication-multicast IP address in its L2 transport network. This is performed in some embodiments using an IGMP protocol learning table. Because the hashing algorithm used to map an overlay-multicast group IP address to a replication-multicast IP address considers, in some embodiments, only the overlay-multicast group IP address, there is a high chance of collision in the hash collision. This collision results in mapping multiple overlay-group IP addresses to single replication-multicast group IP address.

In some embodiments, hash collisions cannot be avoided, even with sophisticated hashing algorithms. Overlapping overlay-multicast group IP addresses causes transport nodes to receive replication-multicast group traffic with overlay groups for which they are not a part. This results in high receive-side uplink bandwidth usage and high central processing unit (CPU) utilization in order to drop these unintended data messages, which causes reduced throughput for overlay-multicast routing.

For example, an SDN controller in some embodiments assigns a replication-multicast IP address 240.2.2.2 for both 232.1.1.1 and 232.2.2.2 overlay-multicast groups. Because of this hash collision, multicast traffic for both overlay-multicast groups is received on all transport nodes of both groups. Transport nodes that are not members of one of the group (but are members of the other group) drop the frames of the group for which they are not members. This results in (1) high receiver side bandwidth usage at uplinks of the transport nodes, and (2) wasted CPU cycles at uplinks to receive and drop the unwanted multicast traffic. Hash collisions also reduce the throughput for other valid traffic flows processed by a transport nodes.

As another example, hash collisions occur when different source IP addresses send traffic to the same overlay-multicast group. For example, there are two sources in some embodiments for the 232.1.1.1 overlay-multicast IP address for which the replication-multicast IP will be 240.2.2.2. In such embodiments, there is no way to differentiate the source the traffic received at the receiver transport node is from because both sources use the same replication-multicast IP address 240.2.2.2.

Hence, methods and systems are needed to avoid unintended data messages from reaching a transport node not registered to receive them. In some embodiments, fine grained traffic replication is achieved by incorporating the source IP address of the overlay-multicast traffic along with the overlay-group IP address in order to enhance hash parameters to derive unique replication-multicast IP addresses for a set of overlay-multicast IP addresses.

In some embodiments, the source IP address of the transport node's VTEP is included as part of the SDN controller receiving VTEP updates to prune multicast traffic received at the ToR switch using source-based (i.e., source specific multicast (SSM)/IGMP version 3 (IGMPv3)) filtering by transport nodes joining the replication-group with a specific VTEP IP address source it is interested. With these two techniques, transport nodes dropping multicast data traffic received at their uplinks is reduced.

FIG. 1 illustrates an example SDN 100. The SDN 100 includes a set of hosts 110. Each host 110 includes one or more physical forwarding elements (PFEs) 130 and one or more machines 135. In some embodiments, the PFEs 130 executing on the hosts 110 are configured to implement a conceptual data plane through which the PFEs 130 exchange data messages with each other. In some embodiments, the PFEs 130 are configured to implement one or more LFEs (not shown), and the data plane is implemented by one LFE or by a set of related LFEs, e.g., by a set of connected logical switches and logical routers. In some embodiments, the SDN 100 has several components (e.g., servers, VMs, host computer modules, etc.) that implement the control plane through which the PFEs 130 are configured to implement a data plane. These control-plane components include a central control plane (CCP) 120 that includes a set of controllers, and local control-plane (LCP) modules 125 operating on the hosts 110. In some embodiments, the SDN 100 also includes one or more standalone PFE devices, such as hardware switches and routers. In such embodiments, an LCP module operates on each standalone PFE device. The CCP 120 of the control plane operates on one host in the SDN 100, and one LCP module operates on each other host computer 110 and hardware PFE 130 in the SDN 100.

The SDN 100 of some embodiments also includes a management plane (MP) implemented by a set of management servers 140. The MP interacts with and receives input data from users, which is relayed to the CCP 120 to configure the PFEs 130. In some embodiments, the MP also receives input data from hosts in the SDN 100 and/or PFEs in the SDN 100, and, based on that input data, manages the control plane. In some embodiments, the management servers 140 process the input data before providing it to the control-plane components 120 and 125. In other embodiments, the management servers 140 provide the input data to the control-plane components 120 and 125 directly as it is given to the management servers 140. The management servers 140 also in some embodiments receive data from PFEs 130 and/or LFEs of the SDN 100, such as topology data, and the management servers 140 use this data to configure the CCP 120. In some embodiments, the hosts 110 also include local management-plane (LMP) modules (not shown). In such embodiments, the management servers 140 communicate with the LMP modules to configure the CCP 120 and the LCP modules 125.

As discussed above, the control plane (i.e., the CCP 120 and the LCP modules 125) configures the PFEs 130 to implement a data plane. The configured PFEs 130 may also implement one or more LFEs to implement the data plane. The machines 135 are the sources and destinations of data messages exchanged using the PFEs 130. In some embodiments, a source machine executing on one of the hosts 110 sends multicast data message flows to a set of one or more destination machines of one or more of the hosts 110 that is part of an overlay-multicast group. In such embodiments, the source machine encapsulates the multicast data message flows with a destination network address assigned to the overlay-multicast group (i.e., a replication-multicast network address) and forwards the flows to an L2 switch 150. In some embodiments, the L2 switch 150 is a hardware switching appliance. In other embodiments, it is a software switch executing on a host computer in the SDN 100.

When the L2 switch 150 receives multicast data message flows destined for an overlay-multicast group, the L2 switch 150 in some embodiments identifies the replication-multicast network address specified as the destination, identifies the machines that are members of the overlay-multicast group, and forwards the multicast data message flows to these members. In some embodiments, the source machine also specifies, in the multicast data message flows, the source's VTEP network address as the source of the flows. In such embodiments, the L2 switch 150 also uses the source VTEP network address along with the replication-multicast network address in order to identify the overlay-multicast group. In some embodiments, this is referred to as source specific multicast (SSM). This ensures that, when different overlay-multicast groups are assigned the same replication-multicast network address, the flows will only be forwarded to the members of the group and not members of a different group assigned the same replication-multicast network address (i.e., because the source is also specified).

In some embodiments, replication-multicast network addresses are assigned to overlay-multicast groups by the set of controllers implementing the CCP 120. In such embodiments, the CCP 120 receives, from a source machine (i.e., from the LCP module of the host computer executing the source machine) that is a source of multicast flows, (1) an overlay-multicast group network address of the overlay-multicast group for which the source sends the multicast flows, (2) an overlay-multicast source network address associated with the source machine, and (3) a source VTEP network address of the source machine's host computer. The CCP 120 uses this information to perform a hash calculation to assign a replication-multicast network address to the overlay-multicast group. By performing a hash calculation using both the overlay-multicast network address and the overlay-multicast source network address, the CCP 120 is less likely to assign the same replication-multicast network address to multiple overlay-multicast groups.

Once assigned, the CCP 120 sends, to the source machine (i.e., to the LCP module of the host computer executing the source machine), a record that maps the overlay-multicast network address, the overlay-multicast source network address, and the source VTEP network address to the assigned replication-multicast group network address. The CCP 120 in some embodiments provides this record to all host computers 110 in the SDN. After receiving this record, the host computer 110 in some embodiments stores it in a data store 145 of the host computer. The source machine uses the record to encapsulate multicast flows with the replication-multicast network address as the destination. Destination machines use the record to register for receiving the multicast flows with the L2 switch 150. In some embodiments, this registration includes (1) the replication-multicast network address, (2) the overlay-multicast source network address, (3) the source VTEP network address of the source host computer, and (3) a destination VTEP network address of the host computer executing the destination machine.

Figure 2:
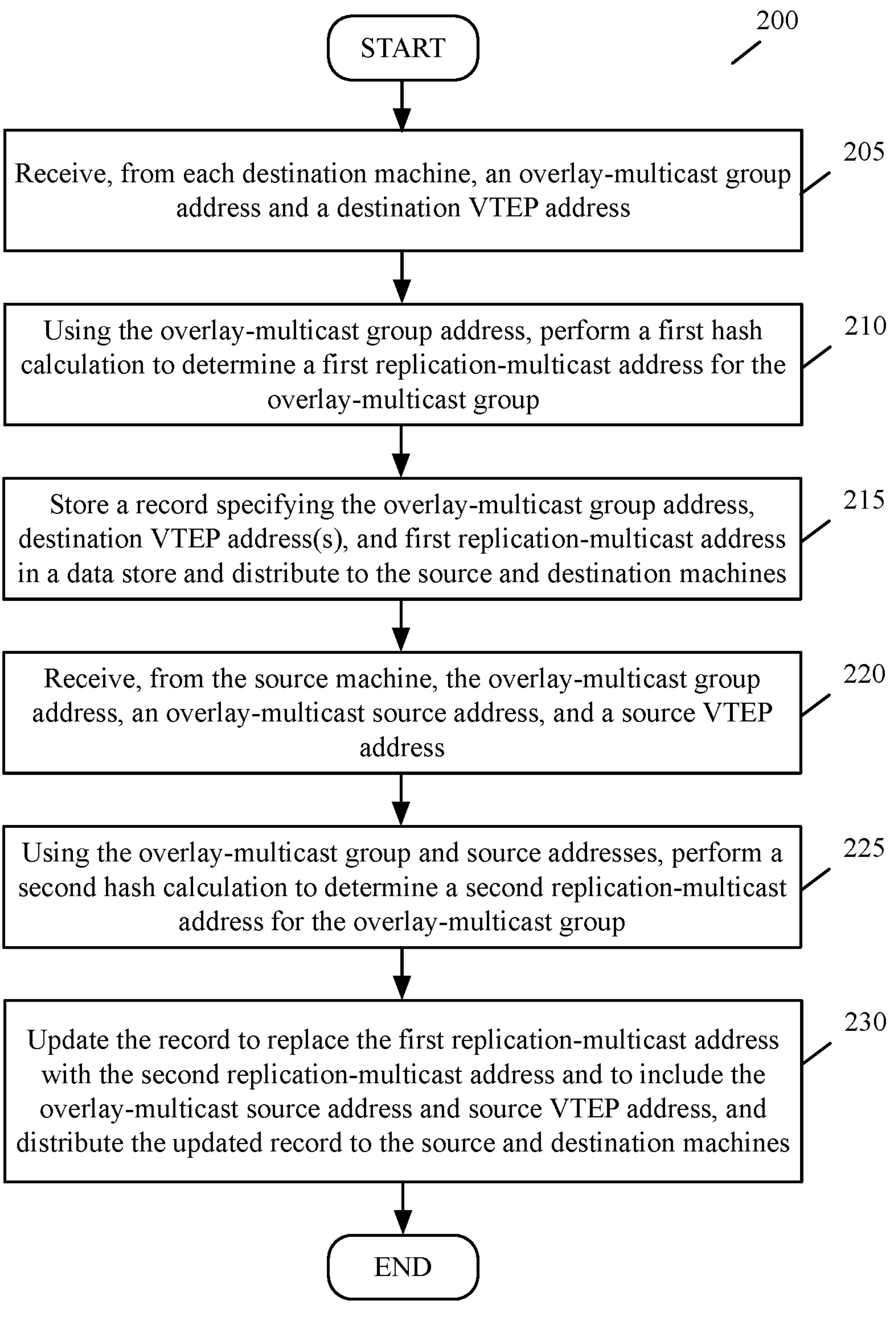
FIG. 2 conceptually illustrates a process of some embodiments for efficiently assigning replication-multicast network addresses to overlay-multicast groups of machines executing on several host computers of an SDN.

FIG. 2 conceptually illustrates a process 200 of some embodiments for efficiently assigning replication-multicast network addresses to overlay-multicast groups of machines executing on several host computers of an SDN. This process 200 is performed in some embodiments by a set of one or more SDN controllers that configures several elements of the SDN (e.g., a CCP of the SDN, such as the CCP 120 of FIG. 1). In some embodiments, the process 300 is performed in order to assign replication-multicast IP addresses to overlay-multicast groups such that different overlay-multicast groups are not assigned a same replication-multicast IP address. The process 200 will be described below for a particular overlay-multicast group that includes a set of one or more destination machines executing on a set of destination host computers and one source machine executing on a source host computer as members. In different embodiments, the source and destination machines are VMs, containers, Pods, etc.

The process 200 begins by receiving (at 205), from each destination machine, an overlay-multicast IP address for the overlay-multicast group and a destination VTEP address for the destination machine's host computer. The destination machines each send an overlay-multicast group interest to the SDN controller set in order for the SDN controller set to update each of these destination machines about the replication-multicast IP address for the group and a list of the destination VTEP addresses for the destination host computers executing the machines in the group. In some embodiments, the received destination VTEP addresses are VTEP IP addresses of the VTEP ports of the destination machines' host computers. In other embodiments, they are the VTEP MAC addresses of the VTEP ports of the destination machines' host computers. In some embodiments, the SDN controller set receives these addresses from LCP modules executing on the destination machines' host computers. The destination machines in some embodiments also provide an overlay-multicast source IP address associated with the source machine from which they wish to receive multicast flows.

Based on the overlay-multicast network address, the process 200 performs (at 210) a first hash calculation to determine a first replication-multicast IP address for the overlay-multicast group. The SDN controller set maps the overlay-multicast IP address to a replication-multicast IP address, which will be used as the destination address for multicast flows sent from the source machine.

Next, the process 200 stores (at 215) a record specifying the received overlay-multicast IP address, the received destination VTEP address(es), and the first replication-multicast IP address in a data store, and distributes the record to the source machine and the set of destination machines. The SDN controller set stores, in a local data store, a mapping table that includes records for all overlay-multicast groups of the SDN. Each record entry includes the overlay-multicast IP address associated with the group, one or more destination VTEP addresses for each host computer executing the destination machines of the group, and the replication-multicast IP address assigned to the group by the SDN controller.

In some embodiments, the SDN controller set distributes this record to each destination machine of the group so they can register to receive multicast flows from the source machine with an L2 switch of the SDN using the first replication-multicast IP address. The SDN controller set distributes the record to the source machine in some embodiments for the source machine to specify the first replication-multicast IP address as the destination for the multicast flows that are to be sent to the set of destination machines. The source machine in some embodiments specified the first replication-multicast IP address as the destination of the flows by encapsulating the flows with the first replication-multicast IP address.

At 220, the process 200 receives, from the source machine, the overlay-multicast IP address, an overlay-multicast source IP address associated with the source machine, and a source VTEP address for the source machine's host computer. In some embodiments, this step is performed after the source machine started sending out multicast flows to the overlay-multicast group by specifying the first replication-multicast IP address as the destination. In some embodiments, the received source VTEP address is the VTEP IP address of the VTEP port of the source machine's host computer. In other embodiments, it is the VTEP MAC address of the VTEP port of the source machine's host computer.

Then, using the overlay-multicast IP address and the overlay-multicast source IP address, the process 200 performs (at 225) a second hash calculation to determine a second replication-multicast IP address for the overlay-multicast group. In some embodiments, assigning replication-multicast IP addresses to overlay-multicast groups based only on their overlay-multicast IP addresses results in two different groups being assigned a same replication-multicast IP address. To avoid this, the SDN controller set in some embodiments performs the second hash calculation also using the overlay-multicast source IP address.

In some embodiments, the first and second replication-multicast IP addresses are the same address, meaning that the first and second hash calculations returned the same replication-multicast IP address for the overlay-multicast group. In other embodiments, the first and second replication-multicast IP addresses are different addresses, meaning that the first and second hash calculations returned different replication-multicast IP address for the overlay-multicast group. In such embodiments, once the second replication-multicast IP address is calculated, it will be the assigned address for the overlay-multicast group instead of the first replication-multicast IP address.

After determining the second replication-multicast IP address, the process 200 updates (at 230) the record to replace the first replication-multicast IP address with the second replication-multicast IP address and to include the overlay-multicast source IP address and source VTEP address, and distributes the updated record to the source and destination machines. After the SDN controller set determines the second replication-multicast IP address to use for the overlay-multicast group, the SDN controller set updates the record for the overlay-multicast group in its local data store.

In some embodiments, the SDN controller set provides the updated record to the source machine in order for the source machine to specify the multicast flows' destination as the second replication-multicast IP address. The SDN controller set provides the updated record to the destination machines so they can register to receive multicast flows from the source machine with an L2 switch of the SDN using both the second replication-multicast IP address and the overlay-multicast source IP address. After distributing the updated record, the process 200 ends.

Figure 3A:
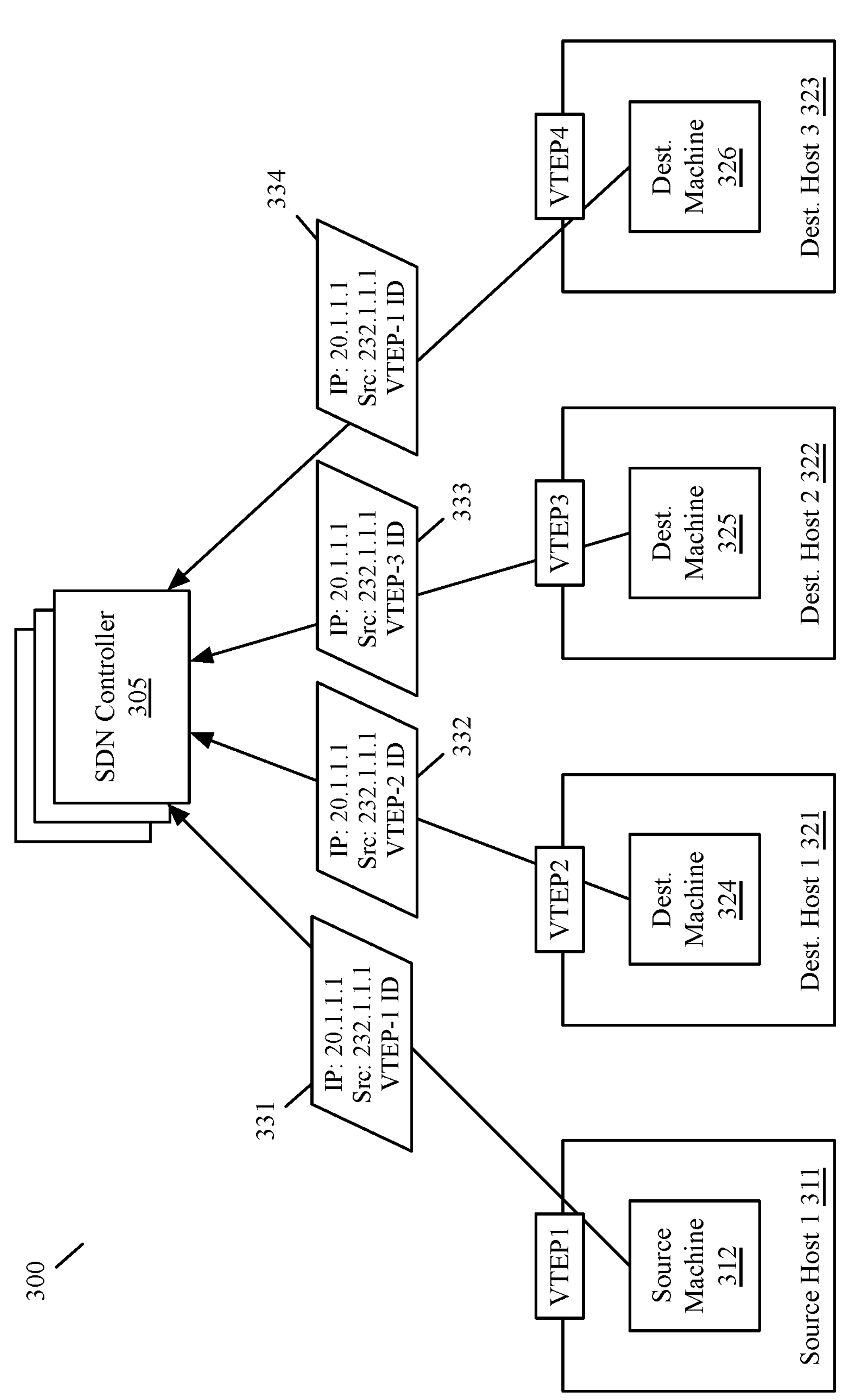
FIGS. 3A-B illustrate an SDN including an SDN controller set that assigns replication-multicast IP addresses to overlay-multicast groups based on data messages received from sources and destinations of the overlay-multicast groups.
Figure 3B:
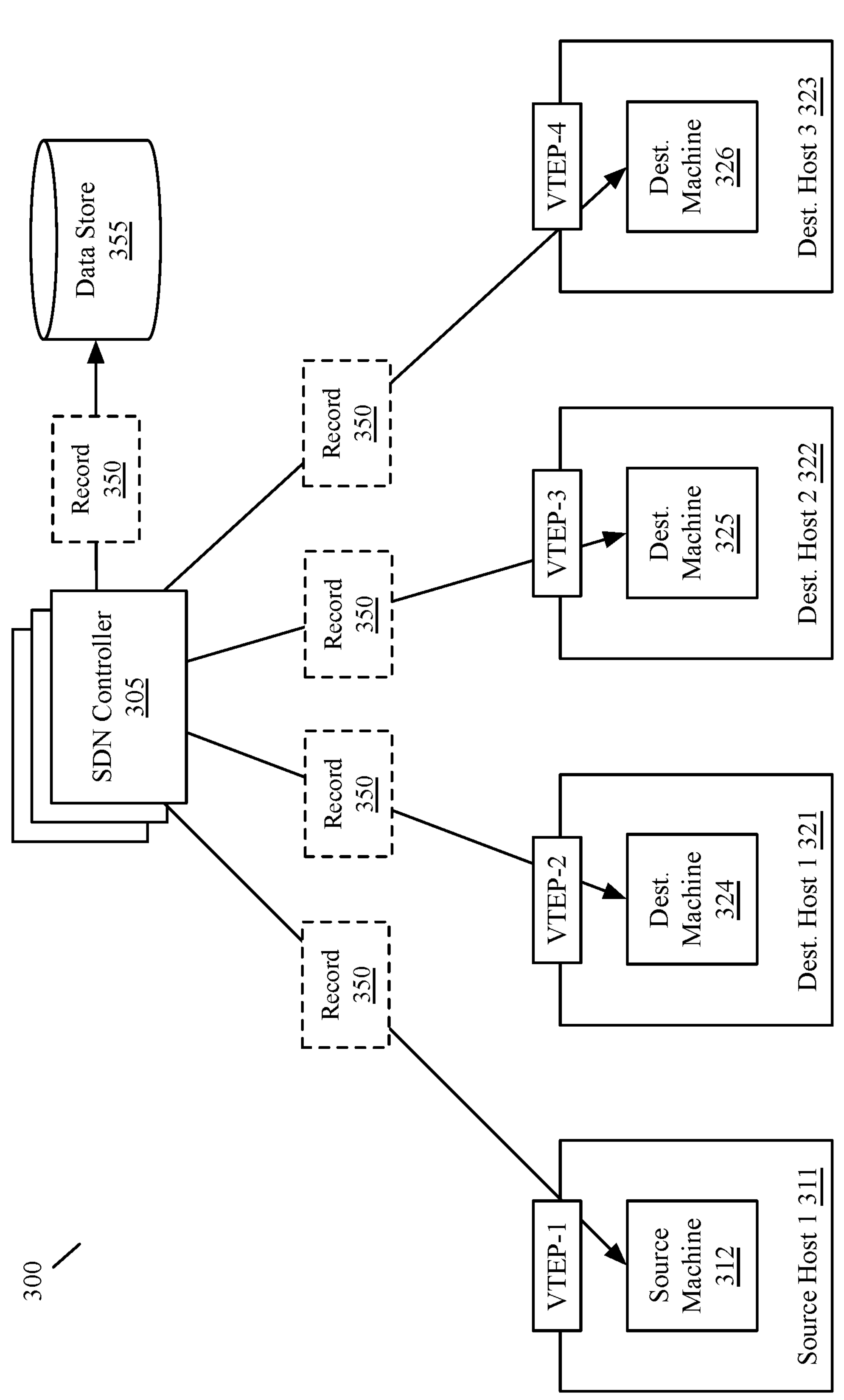

FIGS. 3A-B illustrate an example SDN 300 including an SDN controller set 305 that assigns replication-multicast IP addresses to overlay-multicast groups. The SDN 300 includes one source host computer 311 hosting a source machine 312, which is a source of multicast flows for a particular overlay-multicast group. The SDN also includes three destination host computers 321-323, each hosting a destination machine 324-326 which are the destinations of the multicast flows sent from the source machine 312.

While one source machine and three destination machines are drawn in this example, one of ordinary skill would understand that an SDN can include any number of source machines executing on any number of source hosts for any number of multicast groups and any number of destination machines executing on any number of destination hosts. For instance, an SDN in some embodiments includes one source host executing two different source machines for two different overlay-multicast groups. An SDN in some embodiments includes one destination host that hosts multiple destination machines, which can be destination machines for a same set of overlay-multicast groups or for different overlay-multicast groups. In some embodiments, one host executes both at least one source machine and at least one destination machine.

Each host computer is associated with its own VTEP port. Source host 311 is associated with VTEP-1, destination host 321 is associated with VTEP-2, destination host 322 is associated with VTEP-3, and destination host 323 is associated with VTEP-4. In some embodiments, a distributed logical router (not shown) is implemented across all hosts 311 and 321-323 to interconnect the VMs 312 and 324-326, VTEPs 1-4, and the SDN controller 305. In such embodiments, the distributed logical router is treated as an entity that sends the multicast-group IP address and VTEP information from the hosts 311 and 321-323 to the SDN controller 305. In some embodiments, the distributed logical router also creates the VTEP interfaces of the hosts 311 and 321-323 so that an L2 switch can learn the VTEP IP addresses of these hosts. further information regarding the operations of an L2 switch will be described below.

FIG. 3A illustrates the host machines 312 and 324-326 providing information to the SDN controller 305 in order to assign the particular overlay-multicast group a replication-multicast IP address. The source machine 312 sends a first data message 331 to the SDN controller 305, specifying the overlay-multicast group IP address (20.1.1.1), the overlay-multicast source IP address (232.1.1.1), and the source host 311 VTEP ID (VTEP-1) (e.g., the VTEP port's MAC address or IP address). This data message 331 specifies to the SDN controller 305 that it is to assign the particular overlay-multicast group a replication-multicast IP address using both the overlay-multicast group IP address for the group and the overlay-multicast source IP address for the source machine 312.

Destination machine 324 sends a second data message 332 to the SDN controller 305, specifying the overlay-multicast group IP address (20.1.1.1), the overlay-multicast source IP address (232.1.1.1), and the destination host 321 VTEP ID (VTEP-2) (e.g., the VTEP port's MAC address or IP address). Destination machine 325 sends a third data message 333 to the SDN controller 305, specifying the overlay-multicast group IP address (20.1.1.1), the overlay-multicast source IP address (232.1.1.1), and the destination host 322 VTEP ID (VTEP-3) (e.g., the VTEP port's MAC address or IP address). Destination machine 326 sends a fourth data message 334 to the SDN controller 305, specifying the overlay-multicast group IP address (20.1.1.1), the overlay-multicast source IP address (232.1.1.1), and the destination host 323 VTEP ID (VTEP-4) (e.g., the VTEP port's MAC address or IP address). These data messages 332-334 specify to the SDN controller 305 that it is to associate each of these destination VTEP ports with the particular overlay-multicast group.

Using the received overlay-multicast group IP address and overlay-multicast source IP address, the SDN controller 305 assigns the overlay-multicast group a replication-multicast IP address. FIG. 3B illustrates the SDN 300 after the SDN controller 305 assigns the particular overlay-multicast group a replication-multicast IP address. In this figure, the SDN 300 the SDN controller 305 creates a record 350 that specifies (1) the overlay-multicast group IP address, (2) the overlay-multicast source IP address, (3) the assigned replication-multicast IP address, (4) the source VTEP ID of the source host computer 311 VTEP port, and (5) a list of destination VTEP IDs of the destination host computers 321-323 VTEP ports.

The SDN controller 305 distributes the record 350 to a local data store 355 and to each machine 312 and 324-326. Using the record 350, the source machine 312 is able to encapsulate multicast flows for the overlay-multicast group with the assigned replication-multicast IP address. Using the record 350, each destination machine 324-326 is able to send a group join request to an L2 switch (not shown) in order for the L2 switch to send the multicast flows it receives from the source machine 312 to the destination machine. Further information regarding join requests and the operations of the L2 switch will be described below.

FIG. 4 illustrates an example data store 400 for an SDN controller that assigns replication-multicast IP addresses to overlay-multicast groups. The SDN controller stores, in the data store 400, a mapping table 410 that maps each overlay-multicast group to its destination host VTEP ports, replication-multicast IP address, and source host VTEP port. The table 410 includes a first column 420 that specifies the multicast group key (i.e., the overlay-multicast source IP address and the overlay-multicast group IP address. The table 410 includes a second column 430 that specifies a list of VTEP ports for each destination host computer of the overlay-multicast group. In some embodiments, the list of destination VTEP ports includes the IP addresses of the destination VTEP ports. In other embodiments, it includes the MAC addresses of the destination VTEP ports. The table 410 also includes a third column 440 that specifies the replication-multicast IP address assigned to the overlay-multicast group by the SDN controller using the multicast group key. The table also includes a fourth column 450 that specifies the VTEP port of the source host computer, which may be the IP address or the MAC address of the source VTEP port.

Because the multicast group keys specify the overlay-multicast source IP address as well as the overlay-multicast group IP address, the different overlay-multicast groups are assigned different replication-multicast IP addresses, avoiding a hash collision of overlay-multicast groups. However, in some embodiments, even if the SDN controller uses both the overlay-multicast group address and overlay-multicast source address to assign a replication-multicast IP address, the SDN controller in some embodiments still assigns a same replication-multicast IP address to two or more different overlay-multicast groups. In such embodiments, the operations of the SDN's L2 switch obviates any issues that arise from this situation, which will be described below.

As discussed previously, host computers in an SDN receive, from an SDN controller, overlay-multicast group to replication-multicast IP address assignments. In some embodiments, all host computers in an SDN receive every assignment made for every overlay-multicast group by the SDN controller, regardless of whether the host computer is associated with the overlay-multicast group or not. FIG. 5 illustrates an example data store 500 stored at a host computer. This data store 500 stores a mapping table 510 that stores a record specifying each machine and any overlay-multicast groups for which the machine is a destination machine.

The table 510 includes a first column 520 specifying the machine and a second column 530 specifying any overlay-multicast groups the machine is a member. For instance, the first row specifies Machine 1 is not a member of a replication-multicast group. This is the same for Machine 2 in the second row. In some embodiments, an overlay-multicast group is not specified in this column 530 because the machine is a source of multicast traffic. In other embodiments, it is because the machine has not subscribed to any overlay-multicast groups.

The third row specifies that Machine 3 is associated with an overlay-multicast group whose source VTEP ID is VTEP-1 and whose replication-multicast IP address is 240.3.3.3. The fourth row specifies that Machine 4 is also associated with the overlay-multicast group whose source VTEP ID is VTEP-1 and whose replication-multicast IP address is 240.3.3.3, and the fifth row specifies that Machine 4 is also associated with this overlay-multicast group. The sixth row specifies that Machine 6 is a member of two overlay-multicast groups: (1) a first group whose source VTEP ID is VTEP 1 and whose replication-multicast IP address is 241.4.4.4, and (2) a second group whose source VTEP ID is VTEP 2 and whose replication-multicast IP address is 240.3.3.3.

In some embodiments, each host computer in an SDN stores a mapping table for each machine in the SDN. In other embodiments, each host computer stores a mapping table only for each machine executing on the host computer. Using these records received from the SDN controller, a host computer is able to join a replication-multicast group with an L2 switch of the SDN.

Figure 6:
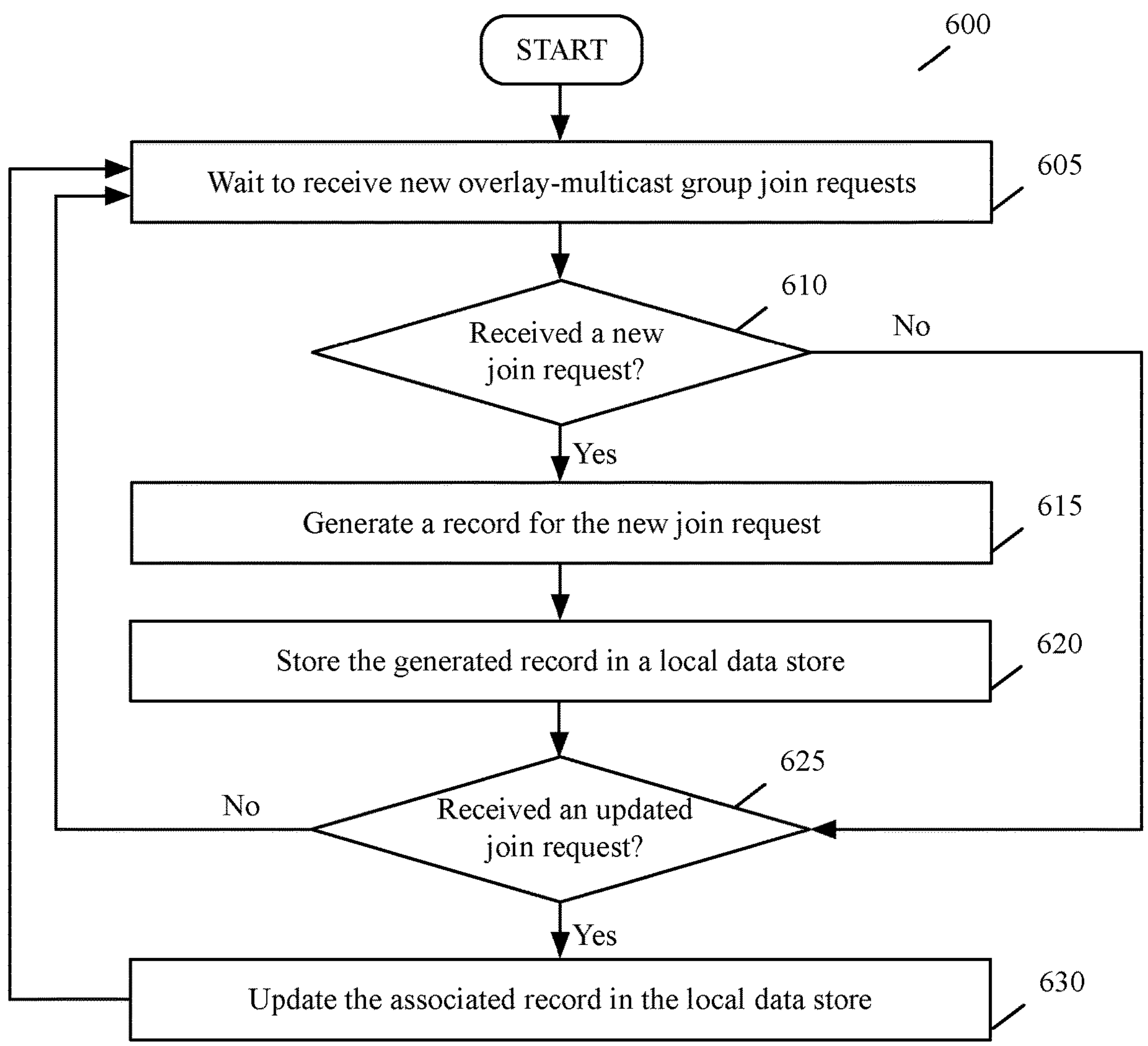
FIG. 6 conceptually illustrates a process of some embodiments for adding destination machines executing on host computers of an SDN to overlay-multicast groups based on replication-multicast IP addresses and overlay-multicast source IP addresses.

FIG. 6 conceptually illustrates a process 600 of some embodiments for adding destination machines executing on host computers of an SDN to overlay-multicast groups based on replication-multicast IP addresses assigned to the overlay-multicast groups and overlay-multicast source IP addresses of source machines executing on host computers of the SDN. This process 600 is performed in some embodiments by an L2 switch of the SDN. In some embodiments, the L2 switch is a ToR switch. In some embodiments, the L2 switch is a hardware switch executing on a standalone appliance. In other embodiments, the L2 switch is a software switch executing on a host computer in the SDN. In some of these embodiments, the L2 switch is a distributed L2 switch implemented on multiple host computers in the SDN.

The process 600 begins by waiting (at 605) to receive new overlay-multicast group join requests from destination machines in the SDN. The L2 switch waits to receive join requests from the destination machines, which send the requests after receiving replication-multicast IP address assignments from an SDN controller of the SDN. In some embodiments, the SDN controller assigns an overlay-multicast group a first replication-multicast IP address based on the group's overlay-multicast group IP address, and provides this assignment to each host computer in the SDN. Then, each host computer that is part of an overlay-multicast group sends a join request to the L2 switch in order for the L2 switch to forward multicast flows of the overlay-multicast group to its members. In some embodiments, the join requests are IGMP join requests.

Next, the process 600 determines (at 610) whether it has received a new join request. The L2 switch determines whether it has received a data message from a destination machine in the SDN regarding joining an overlay-multicast group. In some embodiments, a new join request sent by a destination machine includes (1) a replication-multicast IP address assigned to the overlay-multicast group and (2) the destination VTEP IP address of the host computer executing the destination machine. If the process 600 determines that a new join request has not been received, the process 600 proceeds to step 625, which will be described below.

If the process 600 determines that a new join request has been received, the process 600 generates (at 615) a record for the new join request. In some embodiments, the L2 switch maintains records for each overlay-multicast group. A record in some embodiments includes the replication-multicast IP address and all destination VTEP IDs (e.g., VTEP MAC or IP addresses) for the host computers executing all of the group's destination machines. The record in some embodiments also includes the source VTEP ID associated with the overlay-multicast group's source machine when the source VTEP ID is specified in the join request.

In some embodiments, the L2 switch receives a new join request from a particular destination machine for a particular overlay-multicast group that already has an associated record (e.g., the record was previously created using a new join request from a different destination machine). In such embodiments, rather than generating a new record, the L2 switch updates the currently stored record to include the particular destination machine's associated VTEP ID (e.g., the VTEP port's MAC or IP address). After generating the record, the process 600 stores (at 620) the generated record in a local data store. The L2 switch stores the record in a mapping table with all records for all overlay-multicast groups.

At 625, the process 600 determines whether it has received an updated join request. In some embodiments, after a destination machine has joined an overlay-multicast group with the L2 switch, the destination machine sends an updated join request to the L2 switch. For example, after a particular destination machine has requested a replication-multicast IP address for a particular overlay-multicast group from the SDN controller and before the source machine for the group has started sending flows, the SDN controller in some embodiments assigns the group a first replication-multicast IP address based only on the overlay-multicast group IP address. The particular destination machine sends a new join request to the L2 switch using this first replication-multicast IP address.

Then, when the source machine begins sending flows (which are addressed to the first replication-multicast IP address), the source machine notifies the SDN controller, and the SDN controller assigns a second replication-multicast IP address to the group based also on the overlay-multicast source IP address, and provides this new address to the particular destination machine and the source machine. The particular destination machine then sends an updated join request to the L2 switch that includes the source VTEP ID, associated with the source machine, as the source for the group and the second replication-multicast IP address. Then, when the source machine sends flows to the L2 switch for forwarding to the overlay-multicast group, the L2 switch has the source VTEP ID as the correct source for the flows and has the second replication-multicast IP address as the correct destination for the flows, and forwards the flows to the particular destination machine.

If the process 600 determines that an updated join request has not been received, the process 600 returns to step 605 to continue waiting to receive new overlay-multicast group join requests. If the process 600 determines that an updated join request has been received, the process 600 updates (at 630) the associated record in the local data store. In some embodiments, the updated join request is an IGMPv3 request (which specifies the source as well as the assigned replication-multicast IP address). The L2 switch in some embodiments receives an updated join request that includes a source VTEP ID as the source for a particular overlay-multicast group and the new replication-multicast IP address assigned to the group. In such embodiments, the L2 switch updates the particular overlay-multicast group's record to include the source VTEP ID and to replace the old replication-multicast IP address with the new one.

After updating the associated record, the process 600 returns to step 605 to continue waiting to receive new overlay-multicast group join requests. In some embodiments, the process 600 is performed indefinitely, as the L2 switch continuously waits for new overlay-multicast group join requests from destination machines in the SDN. In other embodiments, the process 600 ends. For example, the process 600 ends in some embodiments when the L2 switch has received a particular number of join requests and updates (e.g., specified by a network administrator and corresponding to the number of overlay-multicast groups in the SDN). The process 600 ends in other embodiments after the L2 switch has not received any join requests or updates from any destination machine for a particular period of time. This particular period of time is specified by a network administrator, in some embodiments.

Figure 7:
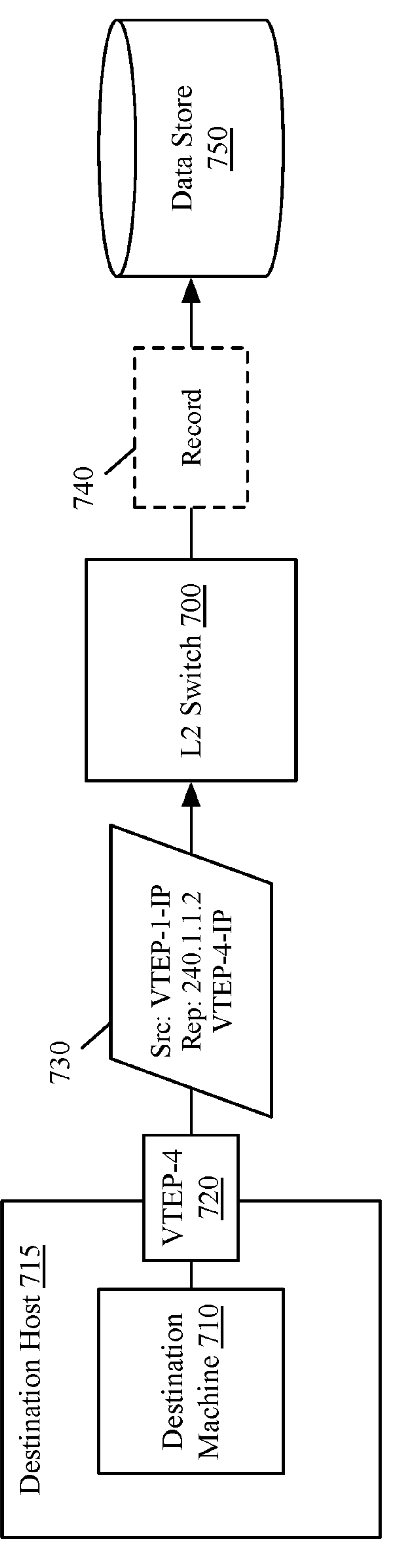
FIG. 7 illustrates an example L2 switch that receives overlay-multicast group join requests from a destination machine.

FIG. 7 illustrates an example L2 switch 700 that receives an overlay-multicast group join request from a destination machine 710. The destination machine 710 executes on a destination host computer 715, which has a VTEP port 720. While only one destination machine 710 and one host computer 715 is illustrated in this figure, one of ordinary skill would understand that the L2 switch 700 in some embodiments facilitates communications for several overlay-multicast groups including any number of destination machines as members.

The destination machine 710 sends a join request data message 730 to the L2 switch 700. This data message 730 includes (1) the source VTEP IP (VTEP-IP) identifying the source of the overlay-multicast group, (2) the replication-multicast IP address (240.1.1.2) assigned to the overlay-multicast group, and (3) the destination VTEP IP (VTEP-4-IP) of the destination machine's host computer 715.

Using this join request data message 730, the L2 switch 700 generates a record 740 and stores the record 740 in a data store 750 local to the L2 switch. In some embodiments, the L2 switch 700 is a hardware switch executing as a standalone appliance. In such embodiments, the data store 750 is implemented within the L2 switch 700. In other embodiments, the L2 switch 700 is a software switch executing an appliance or host computer. In these embodiments, the data store 750 executes on the appliance or host computer along with the L2 switch 700.

In some embodiments, the L2 switch 700 receives first join request from a destination machine (e.g., destination machine 710) that does not include the source VTEP IP address for the group and includes a first replication-multicast IP address assigned to the group. In such embodiments, the L2 switch generates the record without the source VTEP IP address and with the first replication-multicast IP address, and updates this record later when the L2 switch 700 receives an updated join request from the destination machine. In some embodiments, the L2 switch 700 updates the record associated with the overlay-multicast group to specify the source VTEP IP address and a second replication-multicast IP address assigned to the group. The L2 switch 700 in other embodiments generates a new record for the overlay-multicast group to specify the source VTEP IP address and the second replication-multicast IP address, stores the new record in the data store 750, and deletes the old record for the overlay-multicast group from the data store 750 that does not specify the source VTEP IP address and that specifies the old assigned replication-multicast IP address.

FIG. 8 illustrates an example L2 switch data store 800 that stores a record table 810 for different overlay-multicast groups in an SDN. The record table 810 includes a first column 820 specifying the overlay-multicast group (the source VTEP IP address and the assigned replication-multicast IP address), and a second column 830 specifying the list of destination VTEP ports associated with the overlay-multicast group. In some embodiments, the second column 830 lists the individual IP addresses of the destination VTEP ports.

As shown, the first row specifies an overlay-multicast group (*, 240.2.2.2) and a VTEP port list (3, 4, 5, 6). A source VTEP IP address is not specified for this group, indicating (1) that the record was created using a join request that did not specify the source VTEP IP address, and (2) that the overlay-multicast group's replication-multicast IP address was assigned by an SDN controller using only the overlay-multicast group IP address.

The second row specifies an overlay-multicast group (VTEP-1-IP, 240.2.2.3) and a VTEP port list (3, 4, 5). A source VTEP IP is specified for this overlay-multicast group, indicating that (1) the destination machines associated with the listed destination VTEPs specified the source VTEP IP in their join requests, and (2) the assigned replication-multicast IP address was assigned by the SDN controller using an overlay-multicast source IP address along with the overlay-multicast group IP address. The third row specifies an overlay-multicast group (VTEP-2-IP, 240.2.2.3) and a VTEP port list (6). The fourth row specifies an overlay-multicast group (VTEP-1-IP, 241.4.4.4) and a VTEP port list (6).

Using this table 810, an L2 switch forwards multicast flows to overlay-multicast groups based on the source VTEP and the replication-multicast IP address, which avoids sending multicast flows from one source to multiple overlay-multicast groups that are assigned a same replication-multicast IP address.

Figure 9:
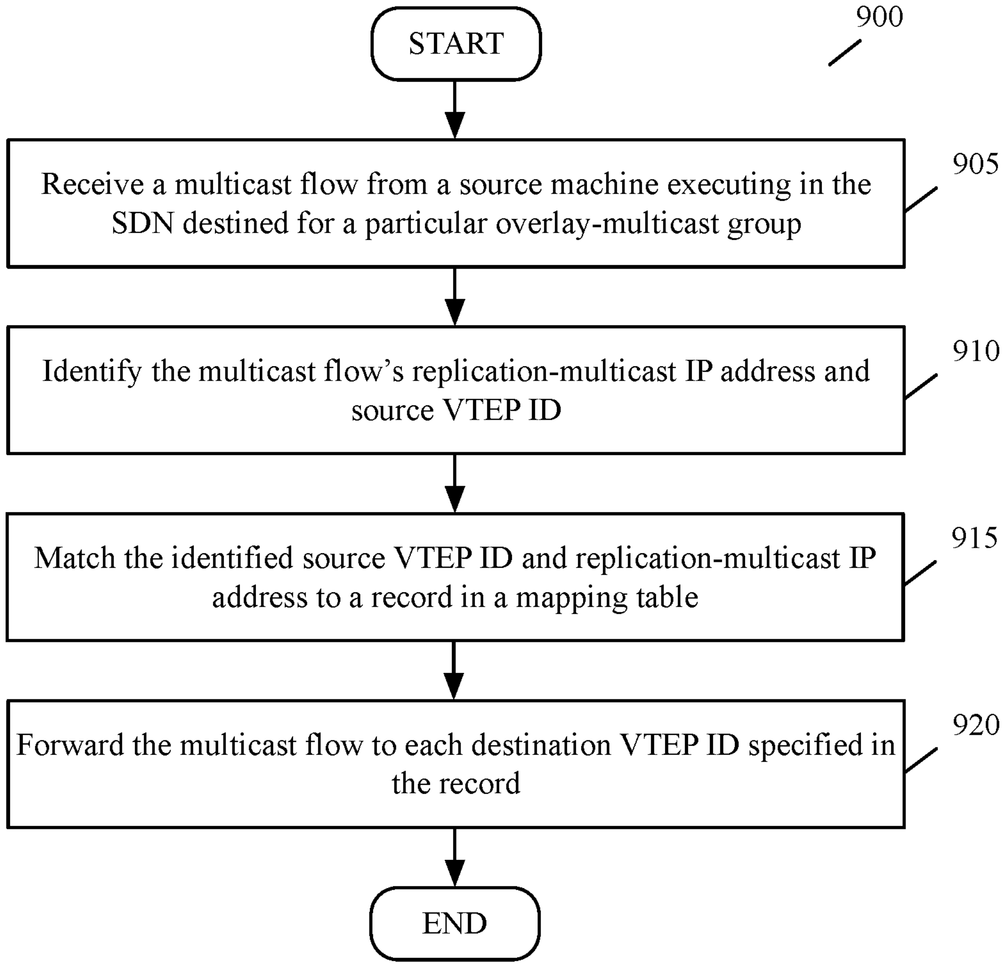
FIG. 9 conceptually illustrates a process of some embodiments for optimizing replication of multicast data message flows to overlay-multicast groups of machines executing on several host computers of an SDN.

FIG. 9 conceptually illustrates a process 900 of some embodiments for optimizing replication of multicast data message flows to overlay-multicast groups of machines executing on several host computers of an SDN. This process 900 is performed in some embodiments by an L2 switch of the SDN. In some embodiments, the L2 switch is a ToR switch. In some embodiments, the L2 switch is a hardware switch executing on a standalone appliance. In other embodiments, the L2 switch is a software switch executing on a host computer in the SDN. In some of these embodiments, the L2 switch is a distributed L2 switch implemented on multiple host computers in the SDN.

The L3 switch in some embodiments maintains, for each of a set of overlay-multicast groups, a record specifying the source of the group, the replication-multicast IP address assigned to the group, and the destinations of the group. In some embodiments, the process 900 is performed each time the L2 switch receives a multicast flow from a source in the SDN for forwarding to an overlay-multicast group.

The process 900 begins by receiving (at 905) a multicast flow from a source machine executing in the SDN destined for a particular overlay-multicast group. The source machine in some embodiments executes on a source host computer in the SDN, and forwards the multicast flow to the L2 switch for the L2 switch to forward it to the particular overlay-multicast group.

Next, the process 900 identifies (at 910) the multicast flows' replication-multicast IP address and source VTEP ID (e.g., the source VTEP IP or MAC address). In some embodiments, the replication-multicast IP address is specified as the destination of the flow, and the source VTEP ID is specified as the source of the flow. The multicast flow is in some embodiments encapsulated with the replication-multicast IP address.

At 915, the process 900 matches the identified source VTEP ID and replication-multicast IP address to a record in a mapping table. In some embodiments, the L2 switch stores, in a local data store, records for each overlay-multicast group in the SDN. Each record specifies, for an overlay-multicast group, the source VTEP ID of the group, the replication-multicast IP address assigned to the group, and a list of one or more destination VTEP IDs for the group. By matching the identified source VTEP ID and replication-multicast IP address to a record, the L2 switch correctly identifies the particular overlay-multicast group associated with the received multicast flow.

In some embodiments, the L2 switch identifies the overlay-multicast group's record using the source VTEP ID because different overlay-multicast groups can be assigned a same replication-multicast IP address (i.e., by the SDN controller's hash calculation, as described above). Using the source VTEP ID along with the assigned replication-multicast IP address to identify the overlay-multicast group, the L2 switch avoids identifying multiple overlay-multicast groups and forwarding the multicast flow to the multiple overlay-multicast groups. For example, the particular overlay-multicast group is in some embodiments assigned a particular replication-multicast IP address that is also assigned to another overlay-multicast group. However, because the L2 switch uses the source VTEP ID along with the replication-multicast IP address to identify the particular overlay-multicast group, the L2 switch does not identify the other overlay-multicast group as a destination of the received multicast flow.

Lastly, the process 900 forwards (at 920) the multicast flow to each destination VTEP ID (e.g., the destination VTEP port's IP or MAC address) specified in the record matching the multicast flows' source VTEP ID and replication-multicast IP address. After finding the record associated with the particular overlay-multicast group, the L2 switch identifies the destinations of the particular overlay-multicast group using the destination VTEP IDs specified in the record. By forwarding the multicast flow to each destination VTEP ID specified in the record, the L2 switch forwards the multicast flow to each destination machine that is a member of the particular overlay-multicast group. After forwarding the multicast flow, the process 900 ends.

Figure 10:
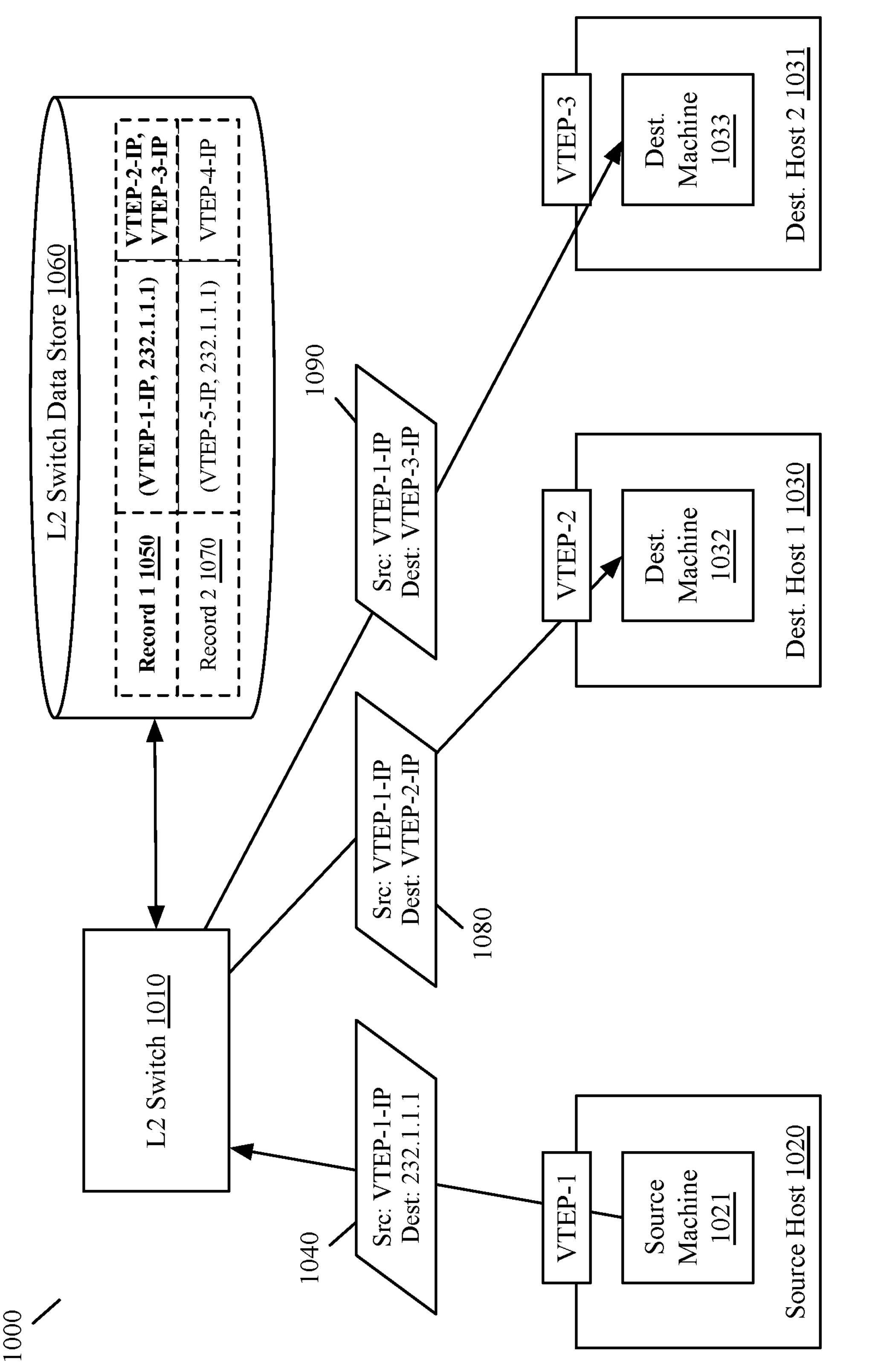
FIG. 10 illustrates an example L2 switch that forwards multicast flows to a set of destination machines based on a replication-multicast IP address and a source VTEP.

FIG. 10 illustrates an example SDN 1000 including an L2 switch 1010 that forwards multicast flows from a source host 1020 to destination hosts 1030-1031 that are members of a particular overlay-multicast group. The source host 1020 includes a source machine 1021 (e.g., a VM, container, Pod, etc.) that is a source of a multicast flow 1040. The destination host 1030 executes a first destination machine 1032 and the destination host 1031 executes a second destination machine 1033. These destination machines 1032-1033 are the destinations of the multicast flow 1040 sent by the source machine 1020. While this figure illustrates one particular overlay-multicast group that includes two destination machines 1032-1033, the L2 switch 1010 in some embodiments facilitates communication of multicast flows for several overlay-multicast groups. Multiple overlay-multicast groups are not drawn for simplicity.

The source machine 1021 forwards the multicast flow 1040 to the L2 switch 1010 of the SDN. The multicast flow 1040 is SSM (i.e., source specific), and specifies the source host's VTEP ID (VTEP-1-IP) as the source and the particular overlay-multicast group's replication-multicast IP address (232.1.1.1) as the destination. Using the specified source and destination, the L2 switch matches the multicast flow 1040 to a first record 1050 stored in a data store 1060. As shown, a second record 1070 for a different overlay-multicast group in the SDN 1000 is assigned the same replication-multicast IP address as the particular overlay-multicast group. However, because the L2 switch 1010 also considers the source VTEP when matching the multicast flow 1040 to a record, the L2 switch 1010 only identifies the first record 1050 as the record associated with the multicast flow 1040.

After identifying the associated record 1050 using the source VTEP ID and replication-multicast IP address, the L2 switch 1010 identifies the destination VTEP IDs (VTEP-2-IP, VTEP-3-IP) specified in the record 1050. After identifying the destination VTEP IDs, the L2 switch 1010 replicates the received multicast flow 1040 into a multicast flow 1080, specifying the first destination host's VTEP ID (VTEP-2-IP) as the destination to forward to the destination machine 1032. The L2 switch 1010 also replicates the received multicast flow 1040 into a multicast flow 1090, specifying the second destination host's VTEP ID (VTEP-3-IP) as the destination to forward to the destination machine 1033.

Because an SDN controller performs a hash calculation to assign a replication-multicast network address based on both the overlay-multicast group network address and the overlay-multicast source network address, hash collisions of overlay-multicast groups are minimized (and, in some embodiments, eliminated). However, even when the SDN controller assigns a same replication-multicast network address to two overlay-multicast groups, because the L2 switch forwards multicast flows based on the replication-multicast network address and the source VTEP ID, multicast flows of one overlay-multicast group are not sent to machines or host computers that are not members of the overlay-multicast group. This eliminates the problem of non-members having to drop multicast flows they end up receiving because multiple overlay-multicast groups have the same replication-multicast network address.

By performing these two optimizations in an SDN, less hash collisions occur between overlay-multicast network addresses when assigning them replication-multicast network addresses. This results in CPU and uplink bandwidth conservation. Additionally, destination transport nodes hosting the destination machines leverage the SSM functionality of L2 switches in order to properly forward multicast flows to their destinations, rather than sending multicast flows to unintended destinations (which results in dropping of flows at transport node uplinks). Furthermore, transport nodes can host a large number of multicast receivers (and other unicast applications) due to minimal (or no) unintended multicast flows being received on their uplinks. Moreover, L2 switches can leverage SSM, even if the overlay-multicast group is IGMP version 2 (and not SSM/IGMPv3).

Figure 11:
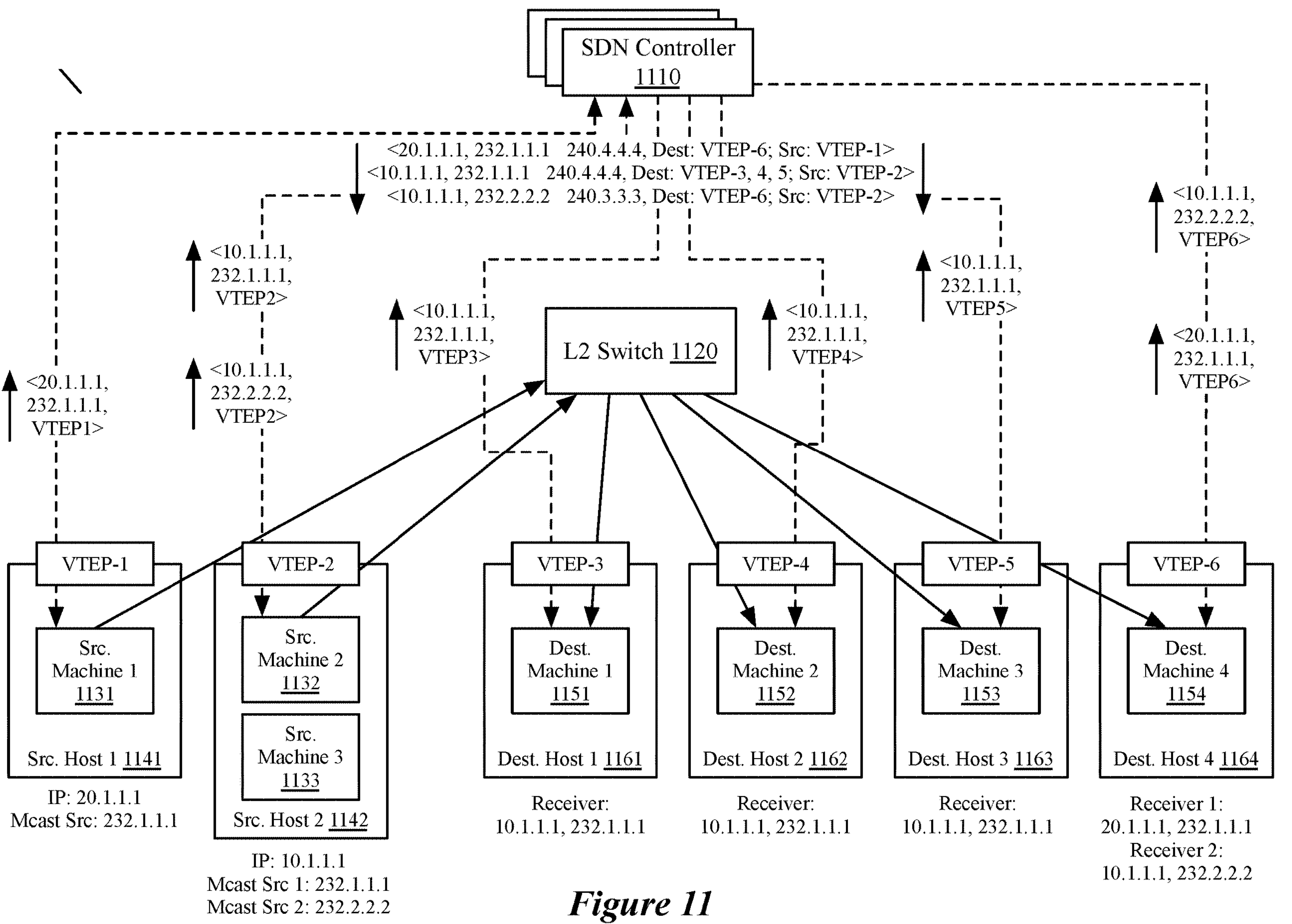
FIG. 11 illustrates an example SDN that uses both an SDN controller and an L2 switch for optimizing replication of multicast flows.

FIG. 11 illustrates an example SDN 1100 that uses both an SDN controller 1110 and an L2 switch 1120 for optimizing multicast flows. The system includes three source machines 1131-1133 executing on two source host computers 1141-1142, and four destination machines 1151-1154 executing on four destination host computers 1161-1164. As shown, two source machines 1132 and 1133 execute on a same host computer 1142.

Each source machine 1132-1133 sends a data message to the SDN controller 1110 that includes the overlay-multicast group IP address, overlay-multicast source IP address, and the source VTEP ID for the source machine's host computer. For instance, source machine 1131 specifies its overlay-multicast group IP address of 232.1.1.1, overlay-multicast source IP address of 20.1.1.1, and the source VTEP ID for VTEP-1. Source machine 1132 specifies its overlay-multicast group IP address of 232.1.1.1, overlay-multicast source IP address of 10.1.1.1, and the source VTEP ID for VTEP-2. Source machine 1133 specifies its overlay-multicast group IP address of 232.2.2.2, overlay-multicast source IP address of 10.1.1.1, and the source VTEP ID for VTEP-2.

Each destination machine 1151-1154 sends a data message to the SDN controller 1110 that includes the overlay-multicast group IP address, overlay-multicast source IP address, and the source VTEP ID for the destination machine's host computer. For instance, destination machine 1151 specifies its overlay-multicast group IP address of 232.1.1.1, overlay-multicast source IP address of 10.1.1.1, and the destination VTEP ID for VTEP-3. Destination machine 1152 specifies its overlay-multicast group IP address of 232.1.1.1, overlay-multicast source IP address of 10.1.1.1, and the destination VTEP ID for VTEP-4. Destination machine 1153 specifies its overlay-multicast group IP address of 232.1.1.1, overlay-multicast source IP address of 10.1.1.1, and the destination VTEP ID for VTEP-5.

In this example, destination machine 1154 sends two data messages to the SDN controller 1110 in order to be a member of two overlay-multicast groups. The first data message sent by destination machine 1154 specifies its overlay-multicast group IP address of 232.2.2.2, overlay-multicast source IP address of 10.1.1.1, and the destination VTEP ID for VTEP-6. The second data message sent by destination machine 1154 specifies its overlay-multicast group IP address of 232.1.1.1, overlay-multicast source IP address of 20.1.1.1, and the destination VTEP ID for VTEP-6.

After receiving these data messages, the SDN controller 1110 determines a replication-multicast IP address for each of the three overlay-multicast groups. After determining these addresses, the SDN controller distributes a record for each overlay-multicast group to all machines 1131-1133 and 1151-1154 in the SDN 1100. A first record for the first overlay-multicast group specifies the overlay-multicast source IP address as 20.1.1.1, the overlay-multicast group IP address as 232.1.1.1, the replication-multicast IP address as 240.4.4.4, the destination VTEP ID for destination VTEP-6, and the source VTEP ID for VTEP-1. A second record for the second overlay-multicast group specifies the overlay-multicast source IP address as 10.1.1.1, the overlay-multicast group IP address as 232.1.1.1, the replication-multicast IP address as 240.4.4.4, the destination VTEP IDs for destination VTEPs 3-5, and the source VTEP ID for VTEP-2. A third record for the third overlay-multicast group specifies the overlay-multicast source IP address as 10.1.1.1, the overlay-multicast group IP address as 232.2.2.2, the replication-multicast IP address as 240.3.3.3, the destination VTEP ID for destination VTEP-6, and the source VTEP ID for VTEP-2.

After receiving these records, the destination machines 1151-1154 register to be members of their respective overlay-multicast groups with the L2 switch 1120. In some embodiments, each registration includes the overlay-multicast source IP address associated with the source of the group, the replication-multicast IP address assigned to the group, and the destination VTEP ID associated with the host computer executing the destination machine.

The source machines 1131-1133 send multicast flows to the L2 switch 1120 with the source specified as the overlay-multicast source IP address and the destination specified as the replication-multicast IP address. Using both the source and the destination of a multicast flow, the L2 switch 1120 sends the multicast flow to each member of the multicast group and does not send it to any machines that are not members.

By optimizing replication of multicast flows at both the SDN controller and the L2 switch, some embodiments eliminate the issue of machines receiving multicast flows of overlay-multicast groups for which they are not members. Without optimizing replication of multicast flows, destination machines send overlay-multicast group interest to an SDN controller using only the overlay-multicast group IP address, which, in turn, updates all machines in the SDN about the overlay-multicast group's replication-multicast IP address and the associated VTEP IDs. Upon receiving this update, the destination machines join the overlay-multicast groups using the L2 switch using replication-multicast IGMP requests. Source machines use the updates from the SDN controller to encapsulate overlay-multicast flows with the assigned replication-multicast IP addresses and send them to the L2 switch. Upon receiving multicast flows, the L2 switch replicates the multicast flows only to the destination machines that have registered to be members of the associated overlay-multicast groups.

Because the SDN controller in these embodiments does not use overlay-multicast source IP addresses when assigning replication-multicast IP addresses, hash collisions are more likely to occur. Additionally, because the L2 switch in these embodiments uses only the replication-multicast IP address when replicating multicast flows to members of overlay-multicast groups, the L2 switch will replicate a particular multicast flow of a first overlay-multicast group to both the first overlay-multicast group and a second overlay-multicast group, when both groups are assigned the same replication IP address. The members of the second overlay-multicast group will receive this unintended flow and drop it, which reduces throughput for overlay-multicast routing. Hence, by optimizing replication of multicast flows at both the SDN controller and the L2 switch, replicating multicast flows to the incorrect machines is avoided, increasing throughput for overlay-multicast routing.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
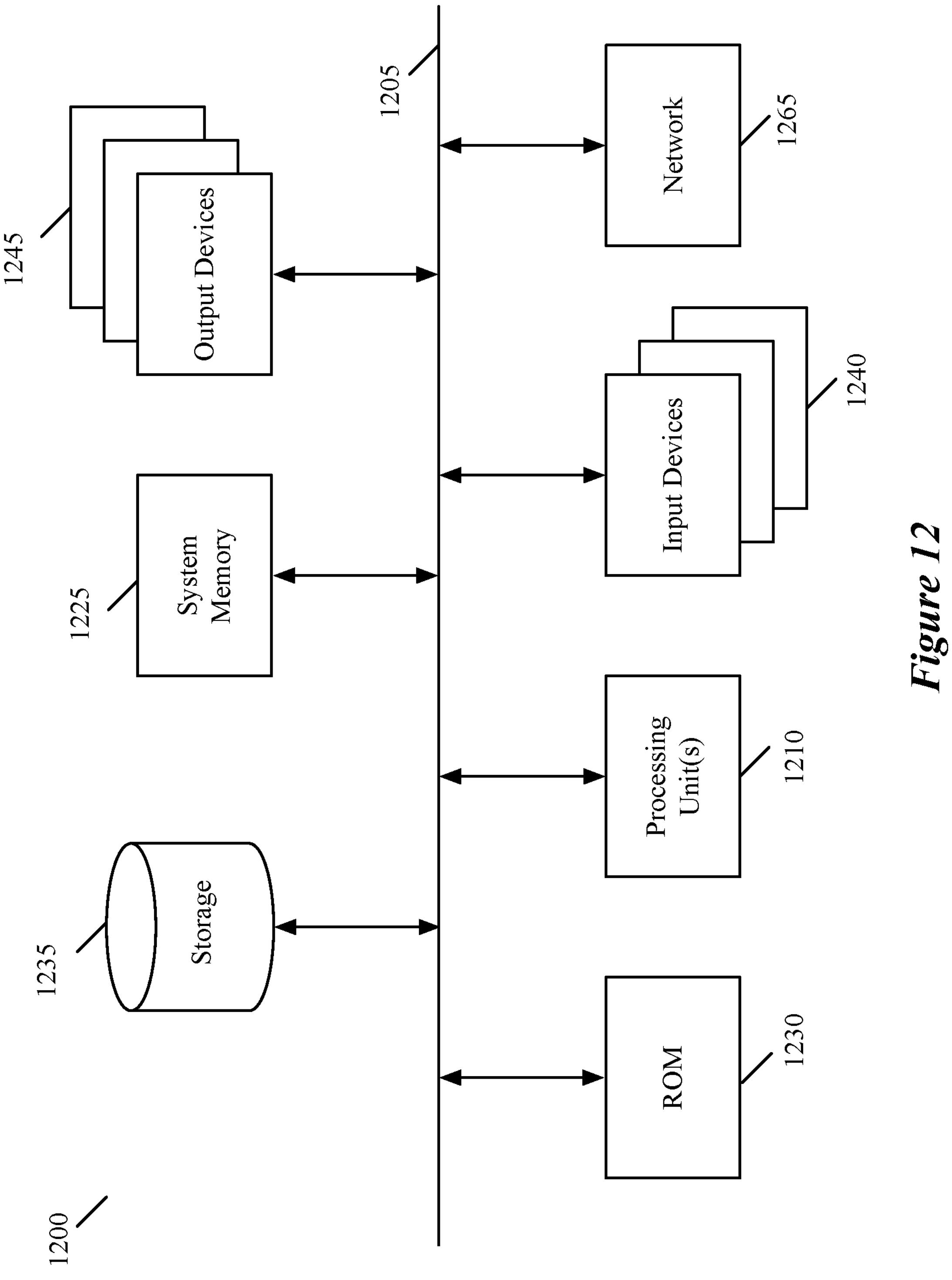
FIG. 12 conceptually illustrates an electronic system with which some embodiments of the invention are implemented.

FIG. 12 conceptually illustrates a computer system 1200 with which some embodiments of the invention are implemented. The computer system 1200 can be used to implement any of the above-described computers and servers. As such, it can be used to execute any of the above described processes. This computer system includes various types of non-transitory machine readable media and interfaces for various other types of machine readable media. Computer system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the computer system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments. The read-only-memory (ROM) 1230 stores static data and instructions that are needed by the processing unit(s) 1210 and other modules of the computer system. The permanent storage device 1235, on the other hand, is a read-and-write memory device. This device is a non-volatile memory unit that stores instructions and data even when the computer system 1200 is off. Some embodiments of the invention use a mass-storage device (such as a magnetic or optical disk and its corresponding disk drive) as the permanent storage device 1235.

Other embodiments use a removable storage device (such as a flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the computer system. The input devices 1240 include alphanumeric keyboards and pointing devices (also called "cursor control devices"). The output devices 1245 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples computer system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of computer system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 2, 6, and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for efficiently assigning replication-multicast network addresses to overlay-multicast groups of machines executing on a plurality of host computers of a software-defined network (SDN), the method comprising:

receiving, by one or more controllers of the SDN from a particular source machine, (i) an overlay-multicast group network address of a particular overlay-multicast group for which the particular source machine is a source, and (ii) an overlay-multicast source network address associated with the particular source machine;

computing, by the one or more controllers using the received overlay-multicast group network address and overlay-multicast source network address, a first replication-multicast network address for the particular overlay-multicast group; and transmitting the computed first replication-multicast network address by the one or more controllers to the particular source machine, wherein the computed first replication-multicast network address is used by the particular source machine to transmit one or more multicast data message flows to a plurality of destination machines that are members of the particular overlay-multicast group.

2. The method of claim 1, further comprising:

providing, by the one or more controllers, a record specifying the overlay-multicast group network address, the overlay-multicast source network address, and the computed first replication-multicast network address to the particular source machine and the plurality of destination machines.

3. The method of claim 2, wherein the particular source machine uses the record to encapsulate the one or more multicast data message flows to include the computed first replication-multicast network address.

4. The method of claim 2, wherein the plurality of destination machines use the record to register with a Layer-2 (L2) switch to receive the one or more multicast data message flows via the L2 switch.

5. The method of claim 4, wherein the L2 switch receives the one or more multicast data message flows from the particular source machine to forward to the plurality of destination machines.

6. The method of claim 2, further comprising:

storing, by the one or more controllers, the record in a table in a local data store, wherein the table stores a record for each overlay-multicast group of the SDN.

7. The method of claim 2 further comprising:

receiving, by the one or more controllers from each of the plurality of destination machines, a destination virtual tunnel endpoint (VTEP) network address of a respective destination host computer executing the destination machine, wherein the record further specifies a list comprising the received destination VTEP network addresses.

8. The method of claim 7, further comprising:

receiving, by the one or more controllers from each of the plurality of destination machines, the overlay-multicast group network address.

9. The method of claim 2, further comprising:

receiving, by the one or more controllers from the particular source machine, a source virtual tunnel endpoint (VTEP) network address of a particular source host computer executing the particular source machine, wherein the record further specifies the source VTEP network address.

10. The method of claim 1, wherein computing the first replication-multicast network address comprises performing a hash calculation using the overlay-multicast group network address and the overlay-multicast source network address as parameters.

11. The method of claim 1, wherein the overlay-multicast group network address and the overlay-multicast source network address are received by the one or more controllers after the particular source machine begins sending the one or more multicast data message flows.

12. The method of claim 11, further comprising:

before the particular source machine begins sending the one or more multicast data message flows:

receiving, by the one or more controllers from the particular source machine, the overlay-multicast group network address; and computing, by the one or more controllers using the overlay-multicast group network address, a second replication-multicast network address for the particular overlay-multicast group.

13. The method of claim 12, wherein the first and second replication-multicast network addresses are different addresses, and the one or more controllers determine the first replication-multicast network address to replace the second replication-multicast network address for the particular overlay-multicast group.

14. The method of claim 12, wherein the first and second replication-multicast network addresses are a same address.

15. The method of claim 1, further comprising:

using, by the particular source machine, the computed first replication-multicast network address to transmit the one or more multicast data message flows to the plurality of destination machines.

16. A non-transitory machine readable medium storing a program which, when executed by at least one processing unit, causes the at least one processing unit to perform a method for efficiently assigning replication-multicast network addresses to overlay-multicast groups of machines executing on a plurality of host computers of a software-defined network (SDN), the method comprising:

receiving, by one or more controllers of the SDN from a particular source machine, (i) an overlay-multicast group network address of a particular overlay-multicast group for which the particular source machine is a source, and (ii) an overlay-multicast source network address associated with the particular source machine;

computing, by the one or more controllers using the received overlay-multicast group network address and overlay-multicast source network address, a first replication-multicast network address for the particular overlay-multicast group; and transmitting the computed first replication-multicast network address by the one or more controllers to the particular source machine, wherein the computed first replication-multicast network address is used by the particular source machine to transmit one or more multicast data message flows to a plurality of destination machines that are members of the particular overlay-multicast group.

17. The non-transitory machine readable medium of claim 16, wherein the method further comprises:

providing, by the one or more controllers, a record specifying the overlay-multicast group network address, the overlay-multicast source network address, and the computed first replication-multicast network address to the particular source machine and the plurality of destination machines.

18. The non-transitory machine readable medium of claim 17, wherein the particular source machine uses the record to encapsulate the one or more multicast data message flows to include the computed first replication-multicast network address.

19. The non-transitory machine readable medium of claim 17, wherein the plurality of destination machines use the record to register with a Layer-2 (L2) switch to receive the one or more multicast data message flows via the L2 switch.

20. The non-transitory machine readable medium of claim 19, wherein the L2 switch receives the one or more multicast data message flows from the particular source machine to forward to the plurality of destination machines.

* * * * *